Figure 17:
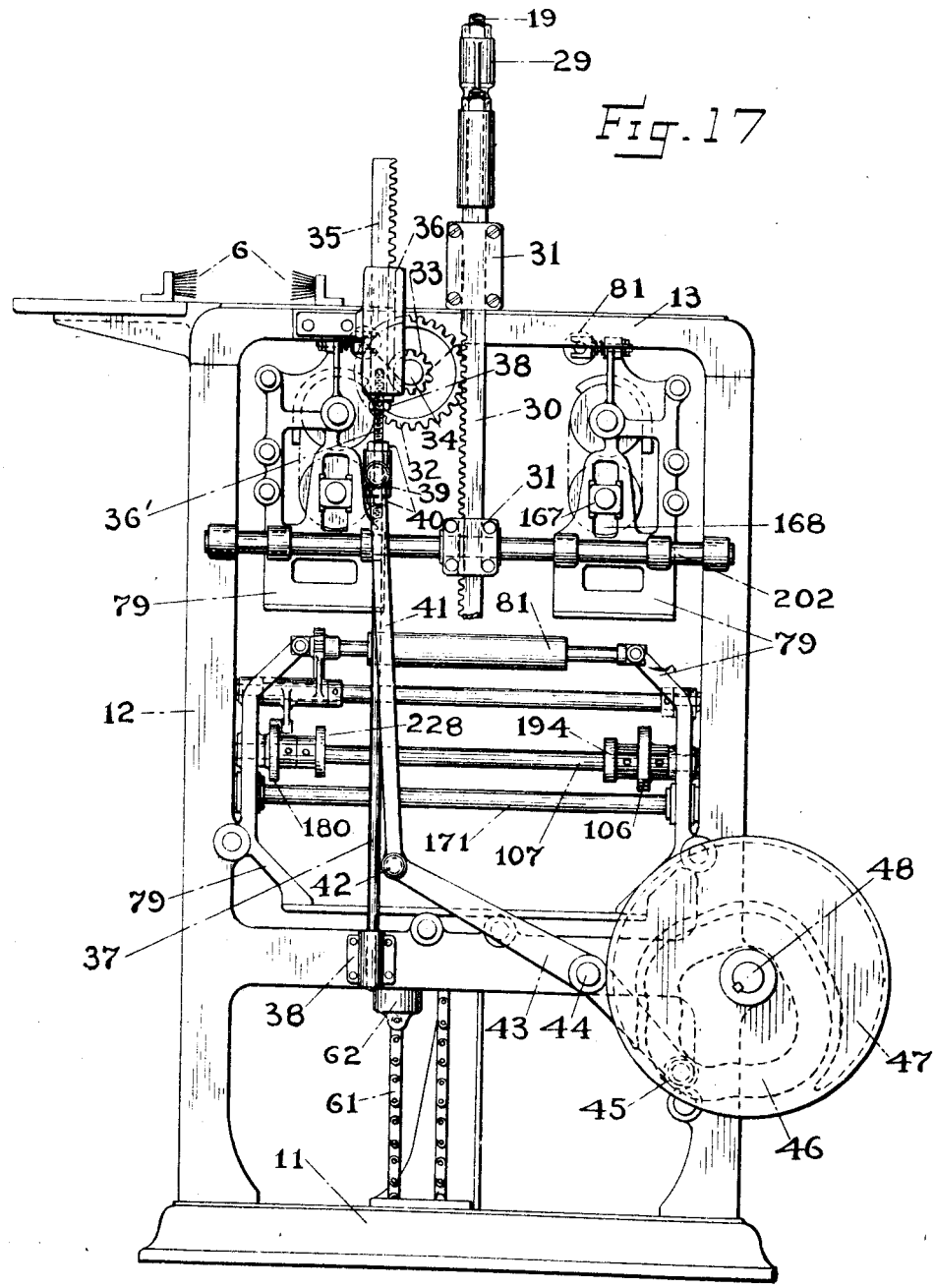

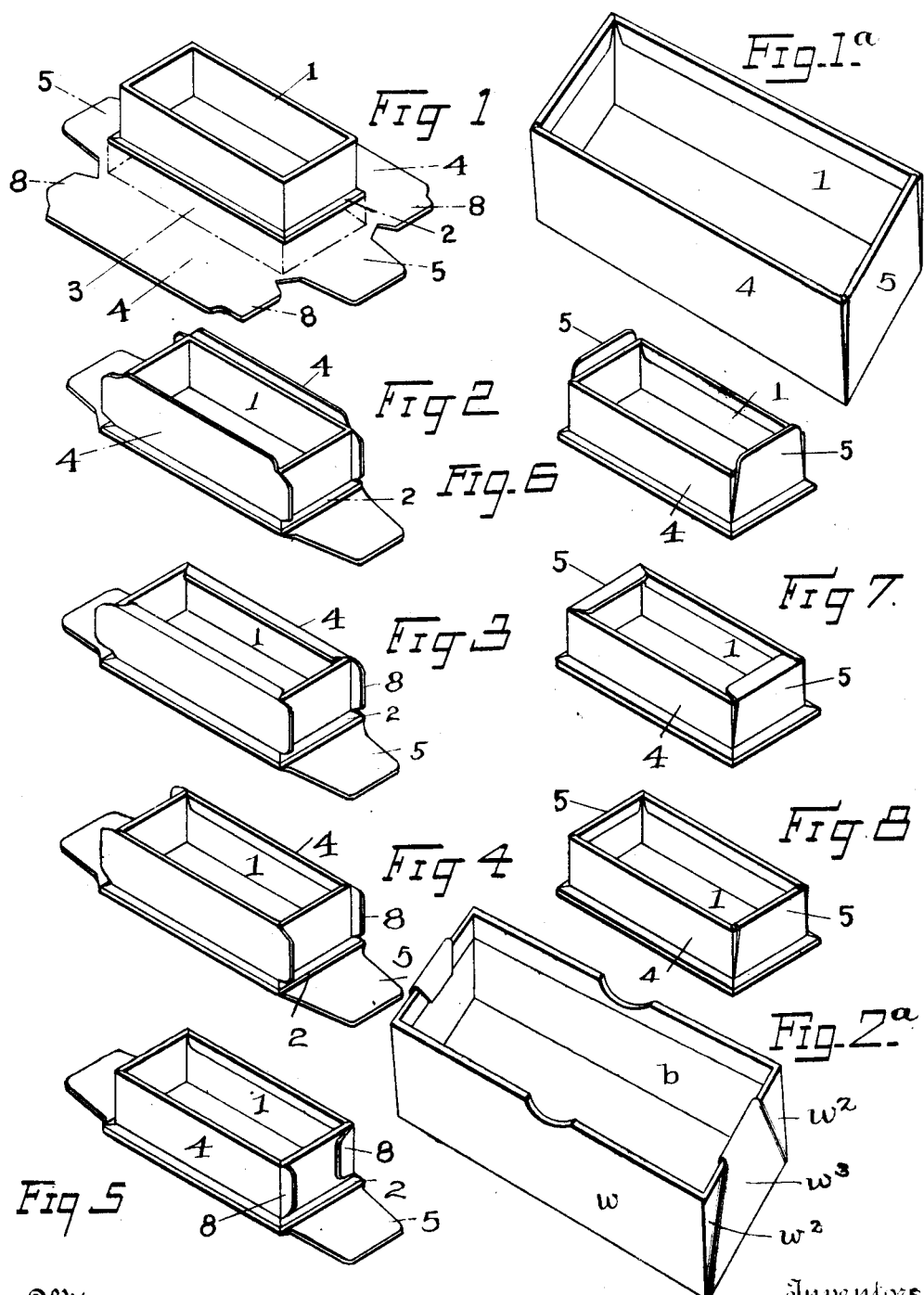

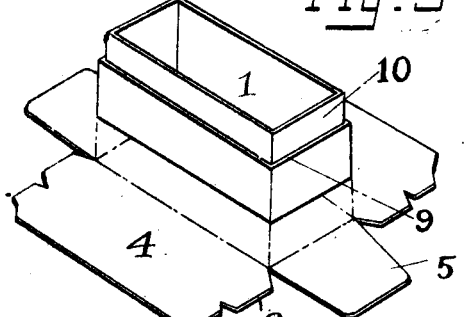
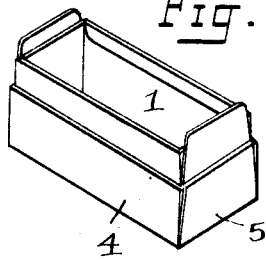
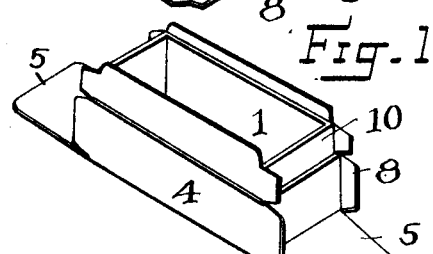
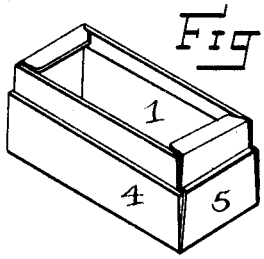
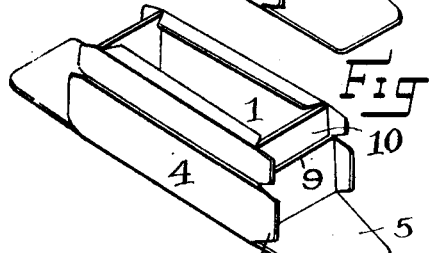
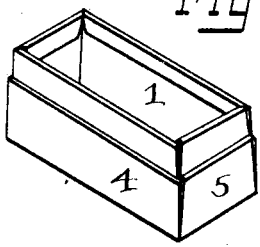
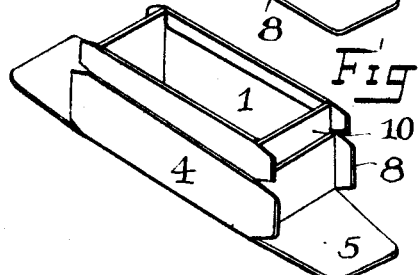
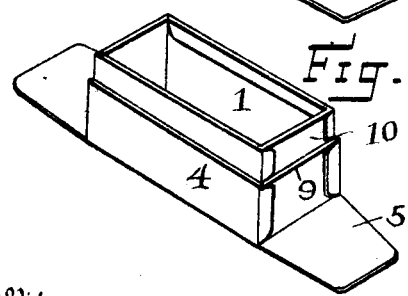
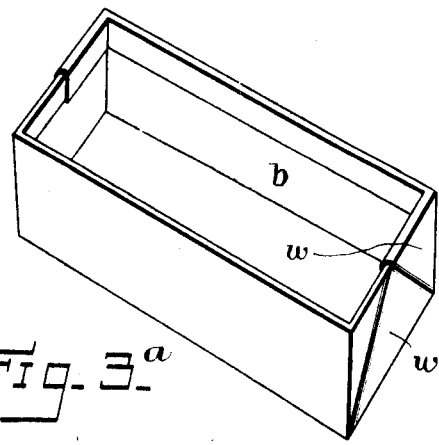

J. P. MARKERT & R. S. BOLGER.
BOX COVERING MACHINE.
APPLICATION FILED NOV. 28, 1908.

1,065,330.

Patented June 17, 1913.
15 SHEETS—SHEET 3.

Witnesses:
G. L. Mockabee
Robert N. Jones

Inventors
John P. Markert
Robert S. Bolger
By Attorneys

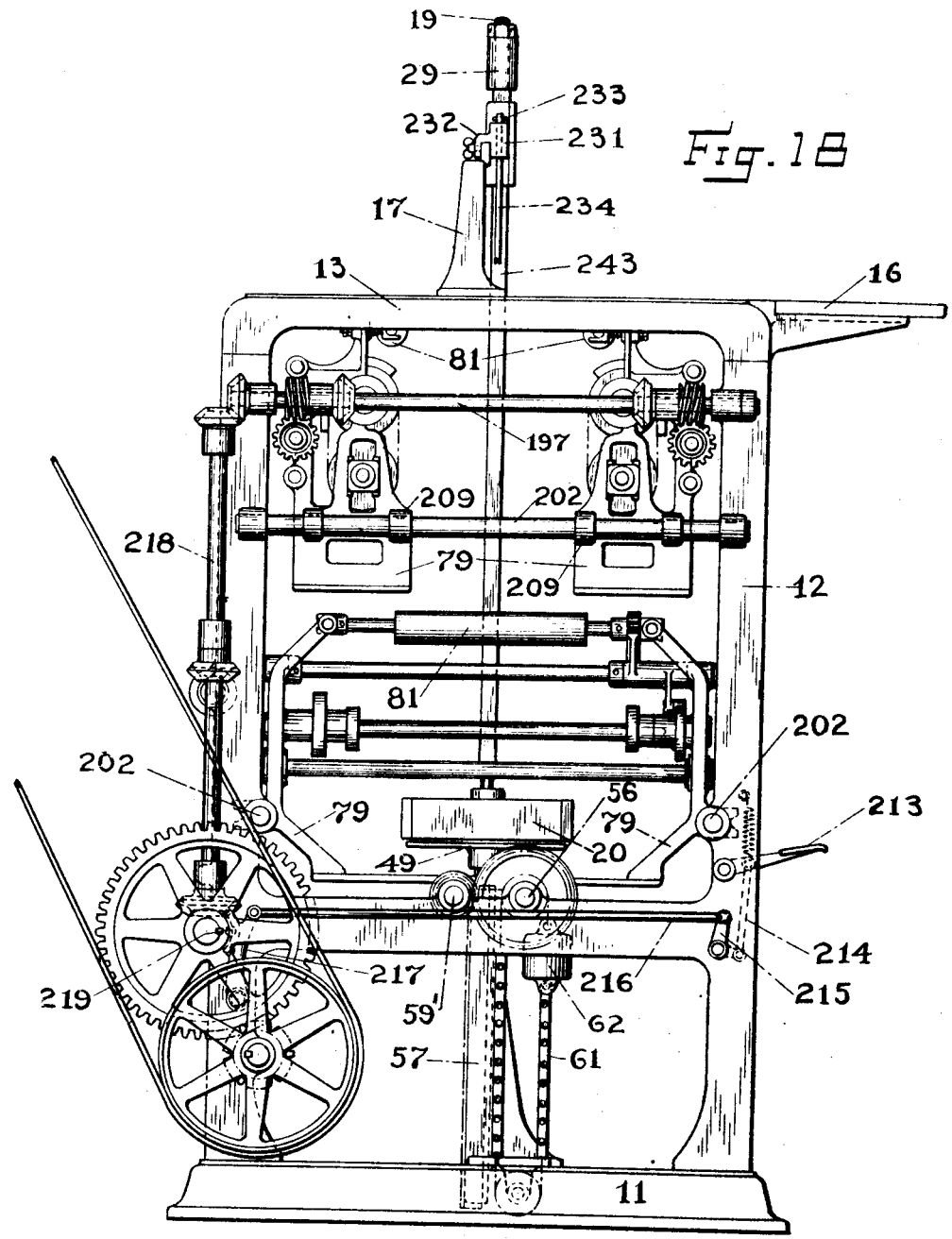

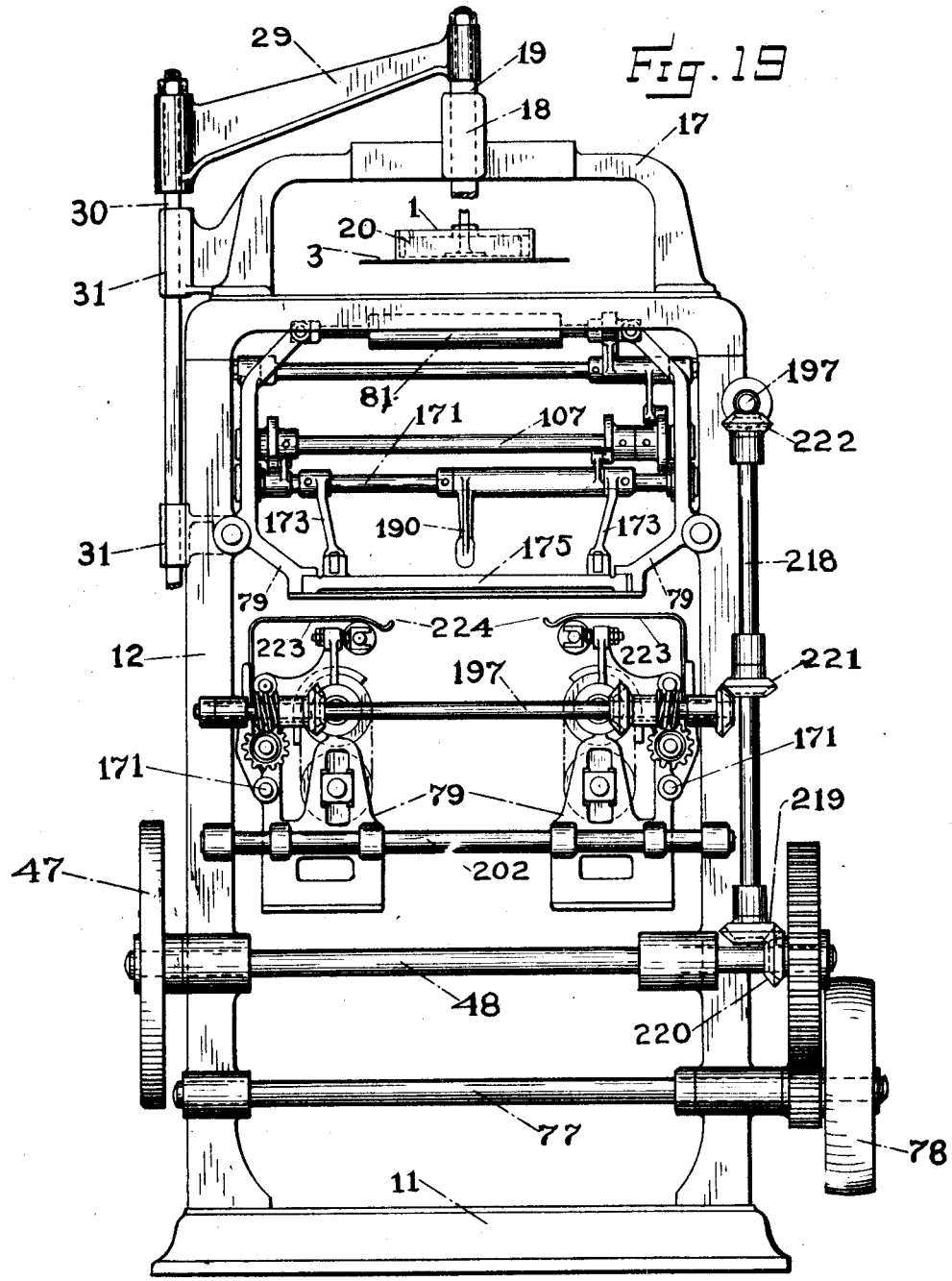

J. P. MARKERT & R. S. BOLGER.
BOX COVERING MACHINE.
APPLICATION FILED NOV. 28, 1908.

1,065,330.

Patented June 17, 1913.
15 SHEETS—SHEET 6.

Witnesses

Inventors
John P. Markert
Robert S. Bolger
Attorney

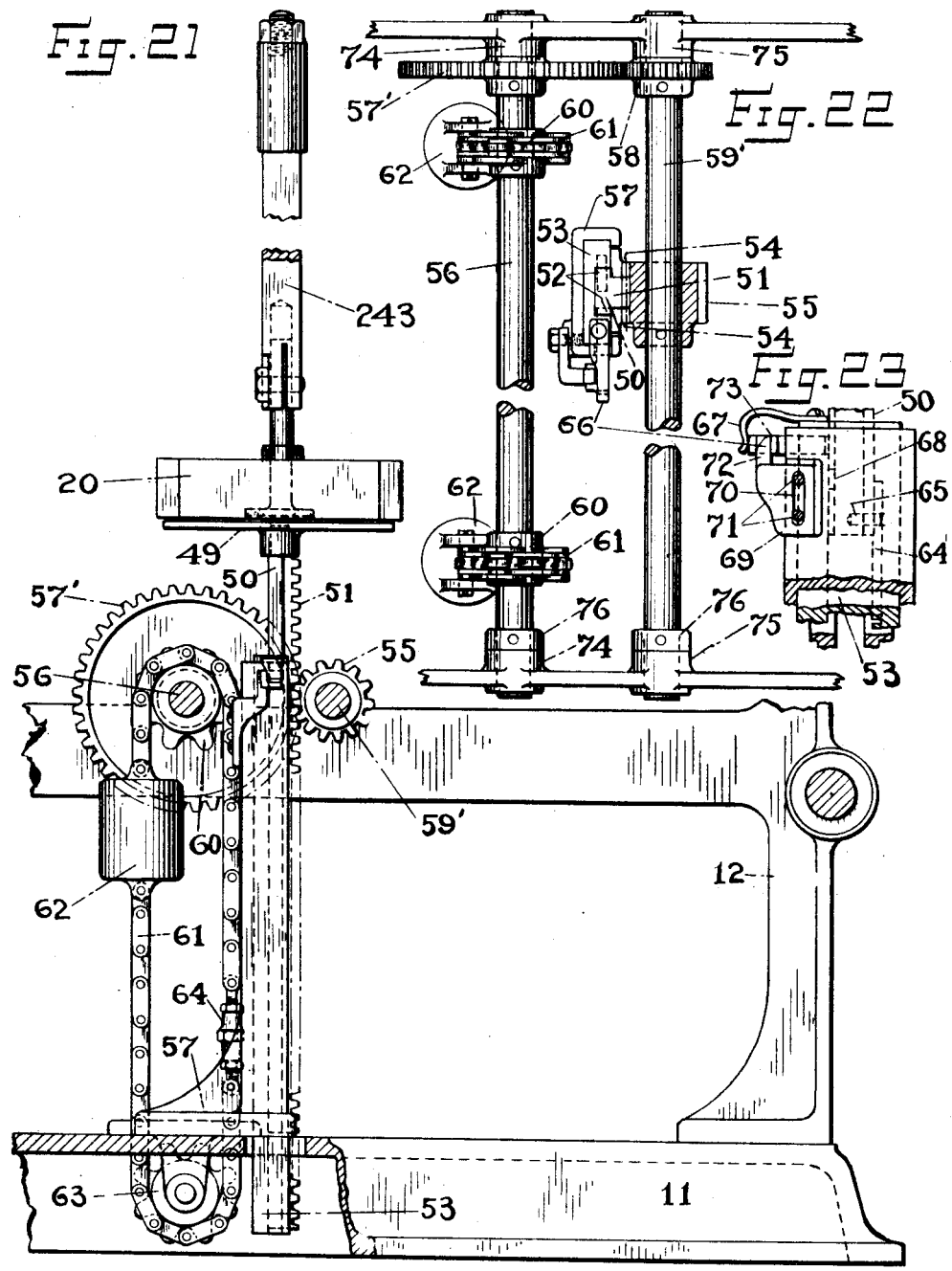

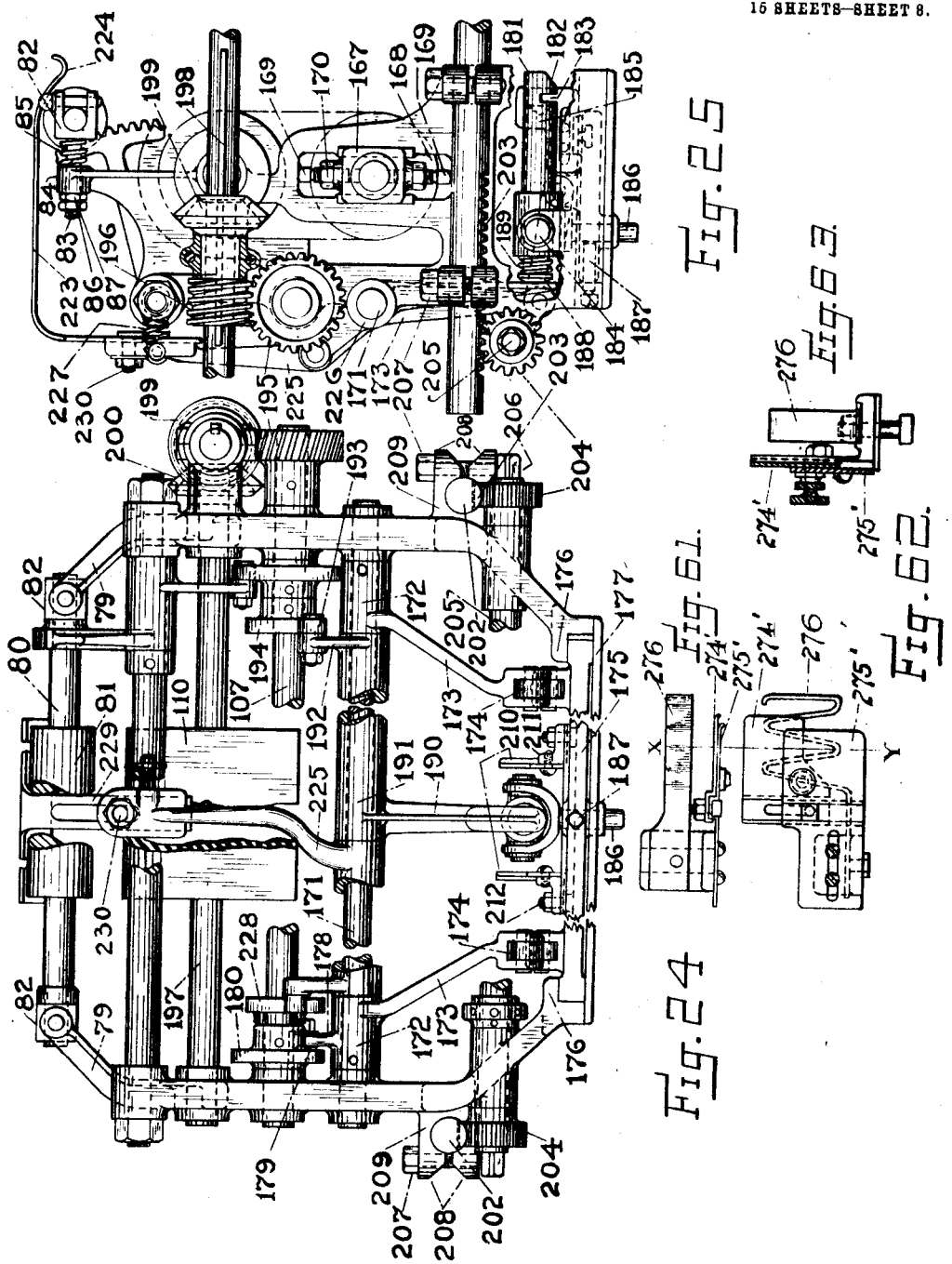

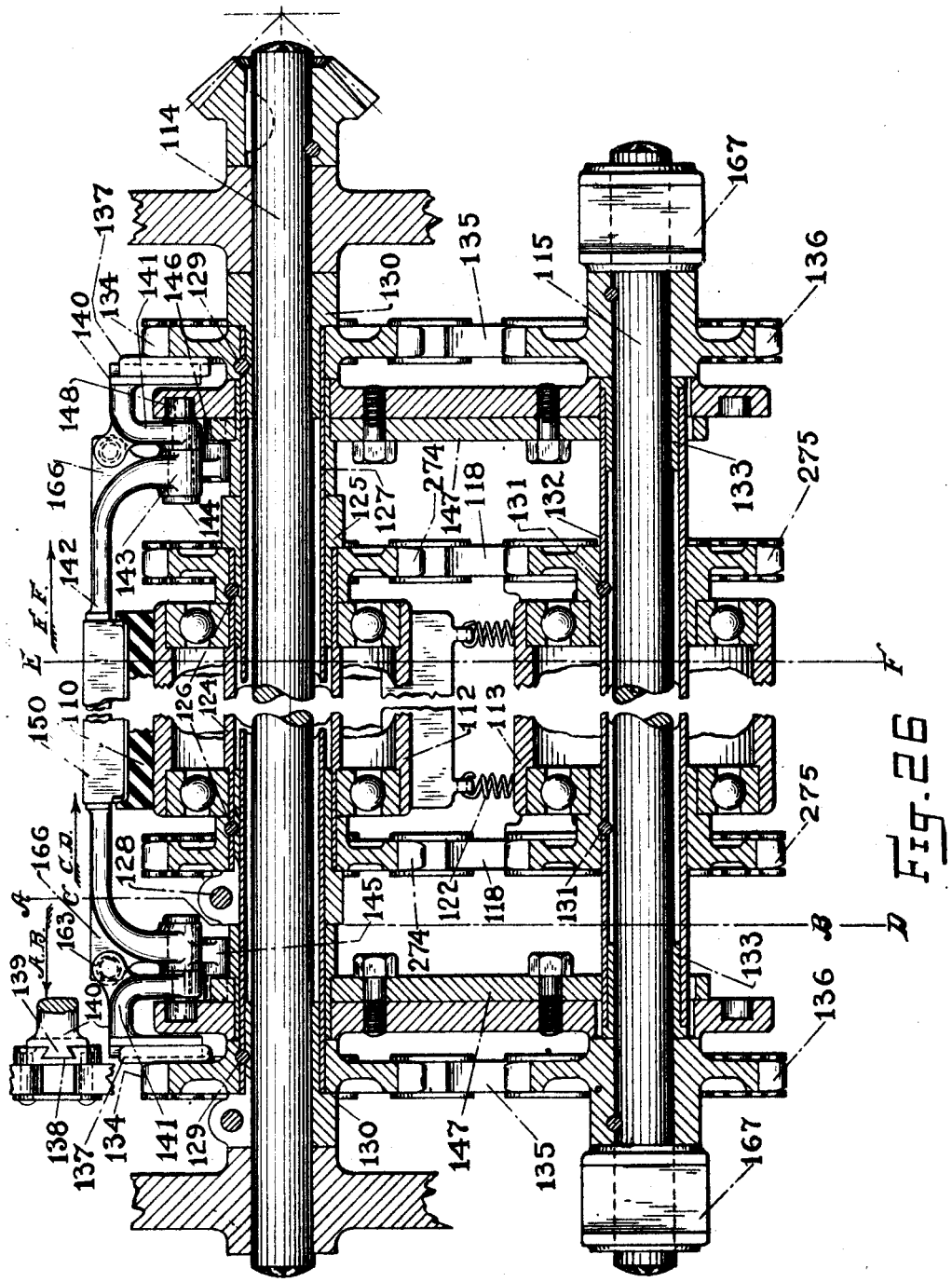

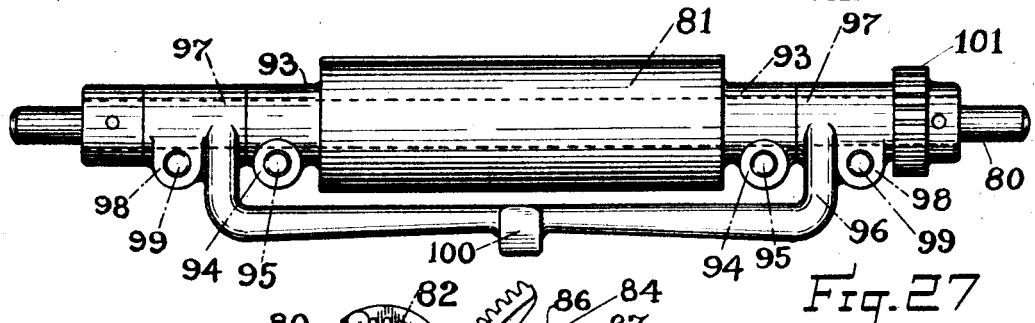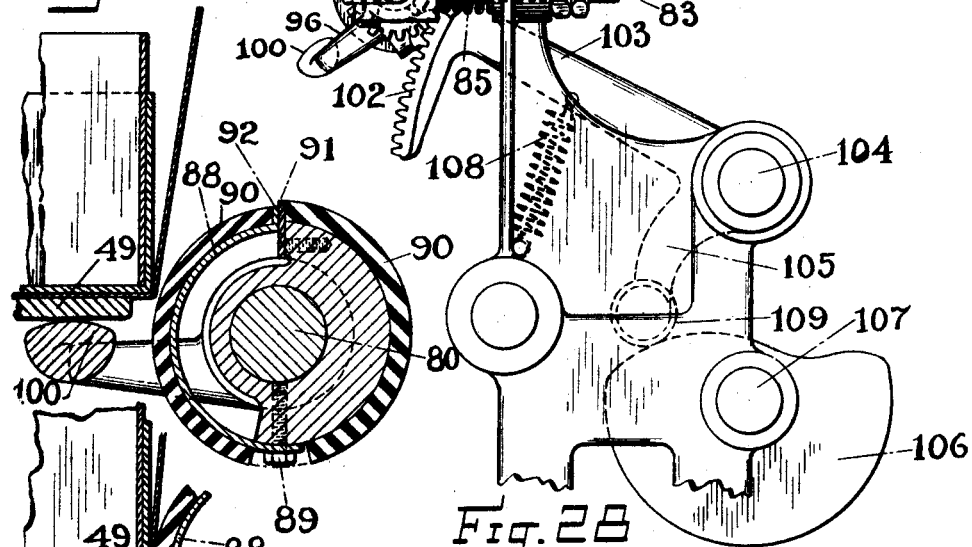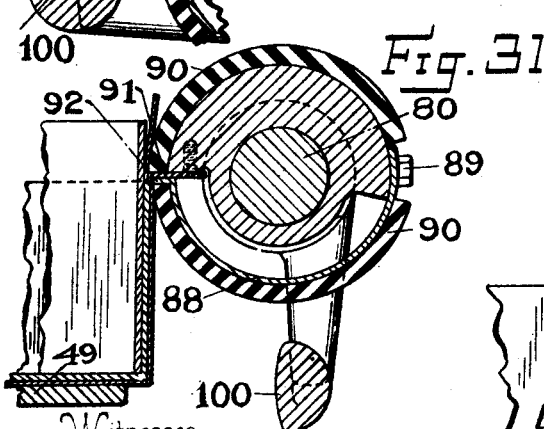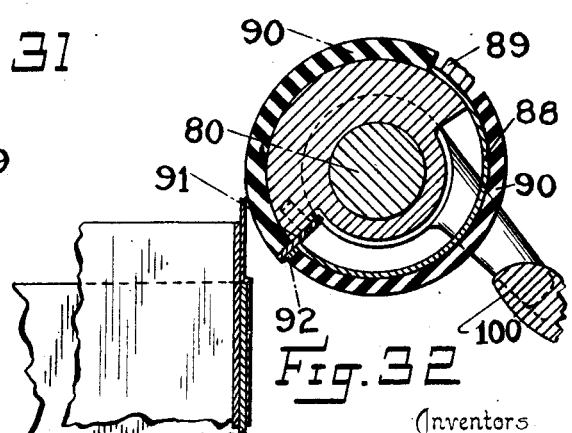

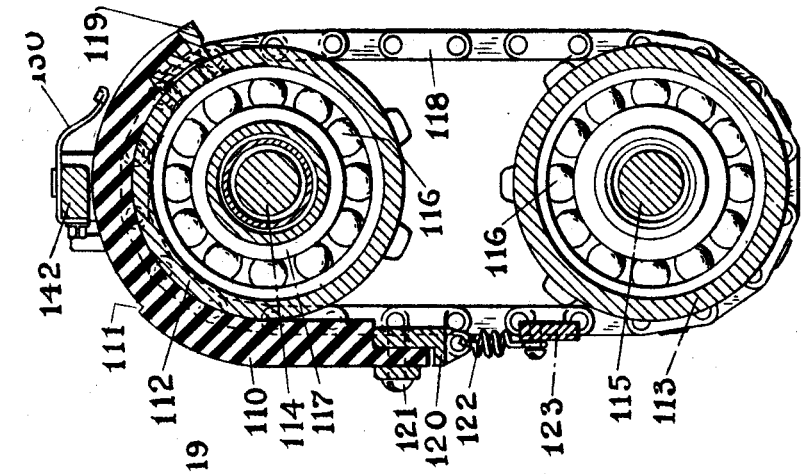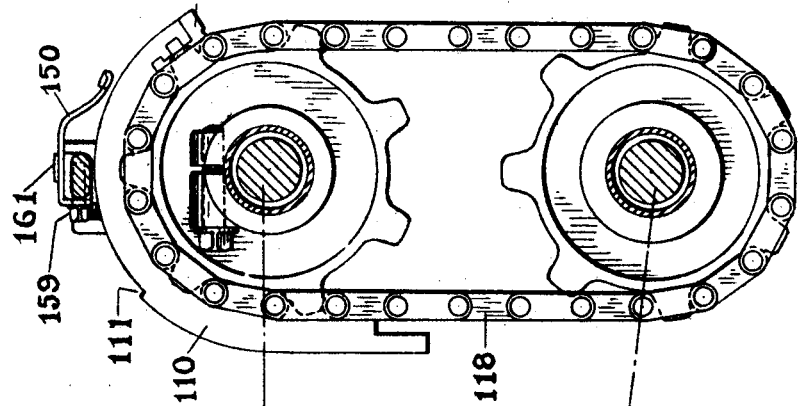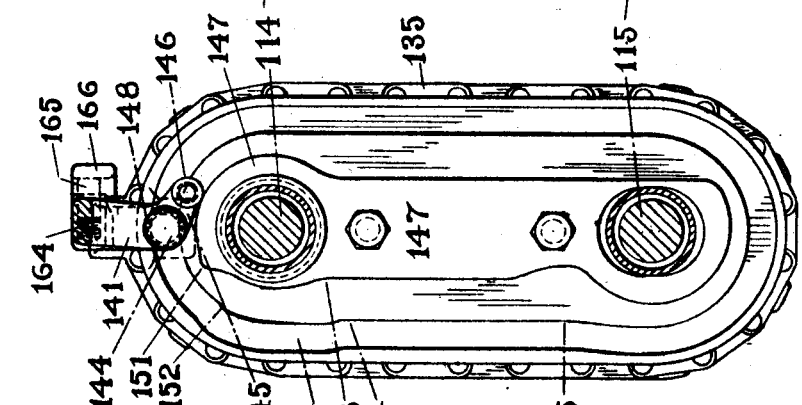

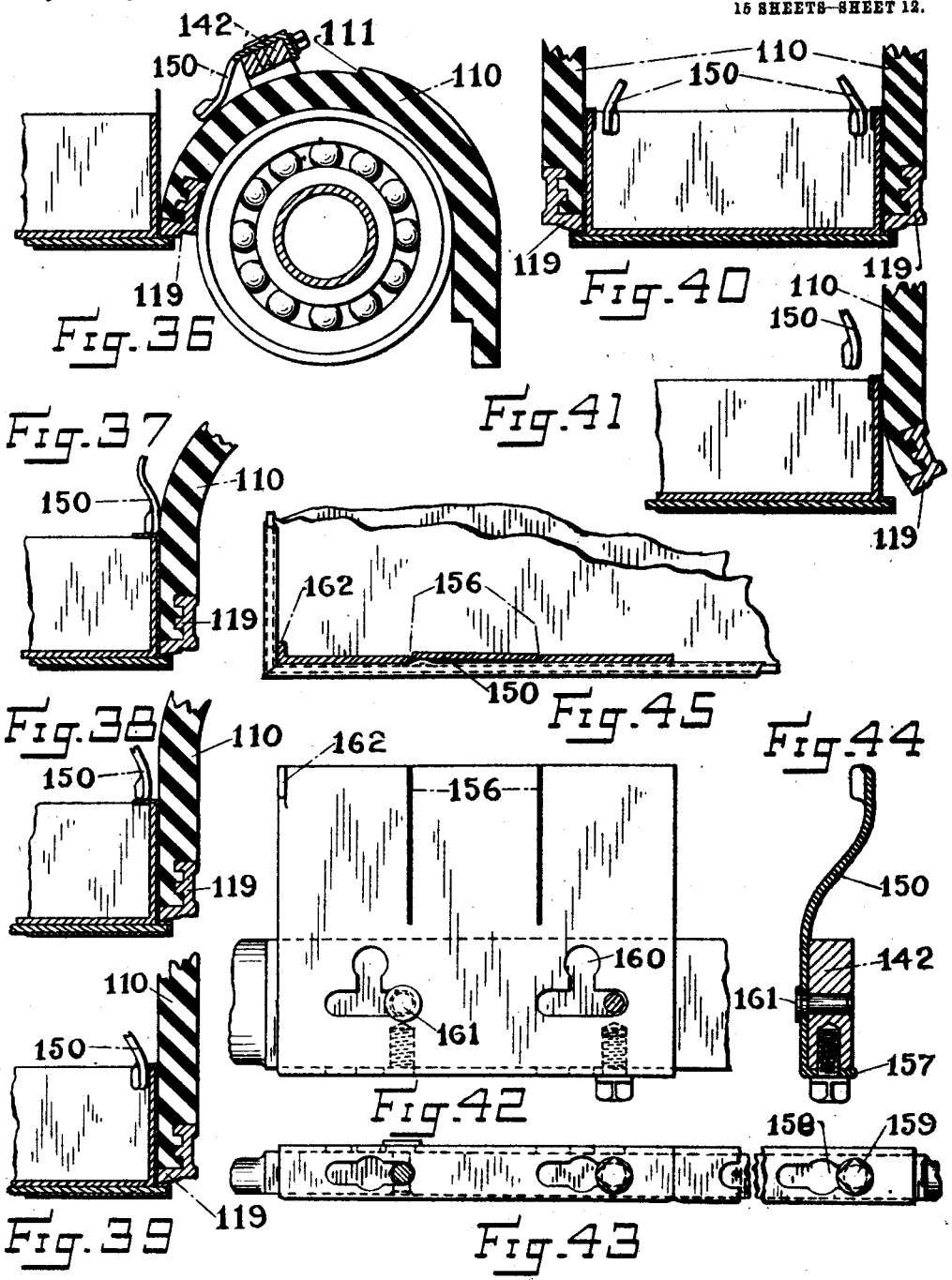

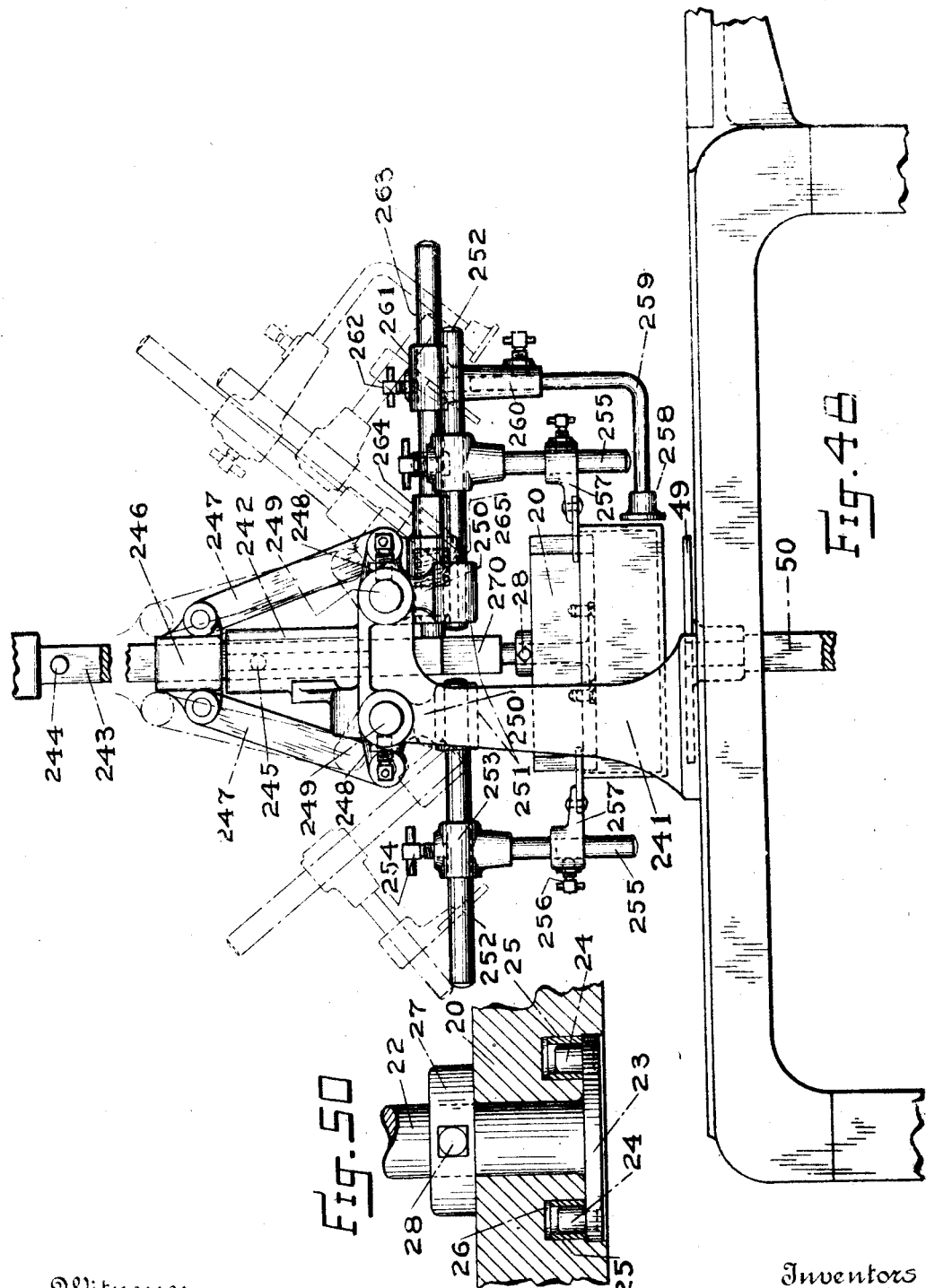

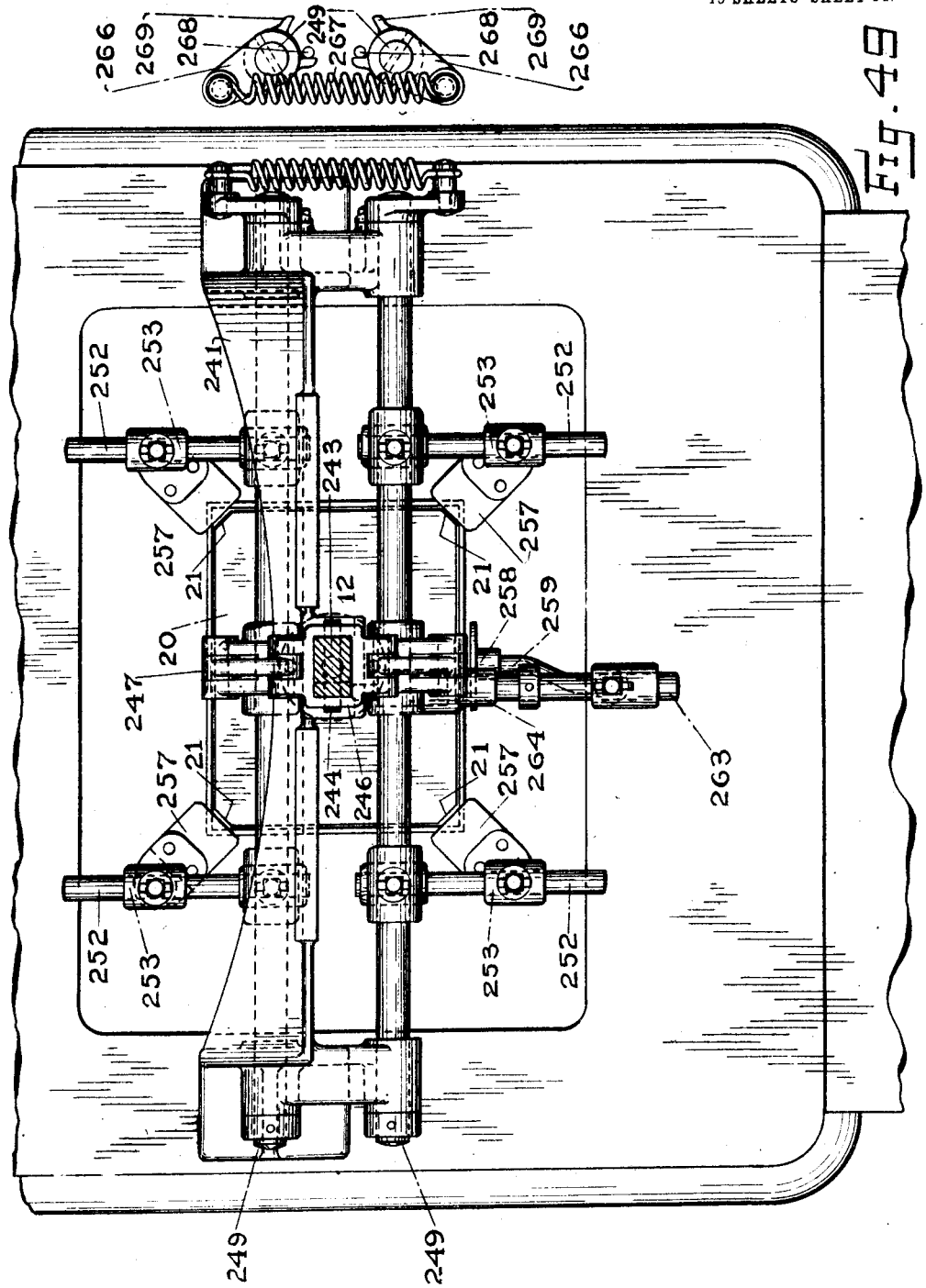

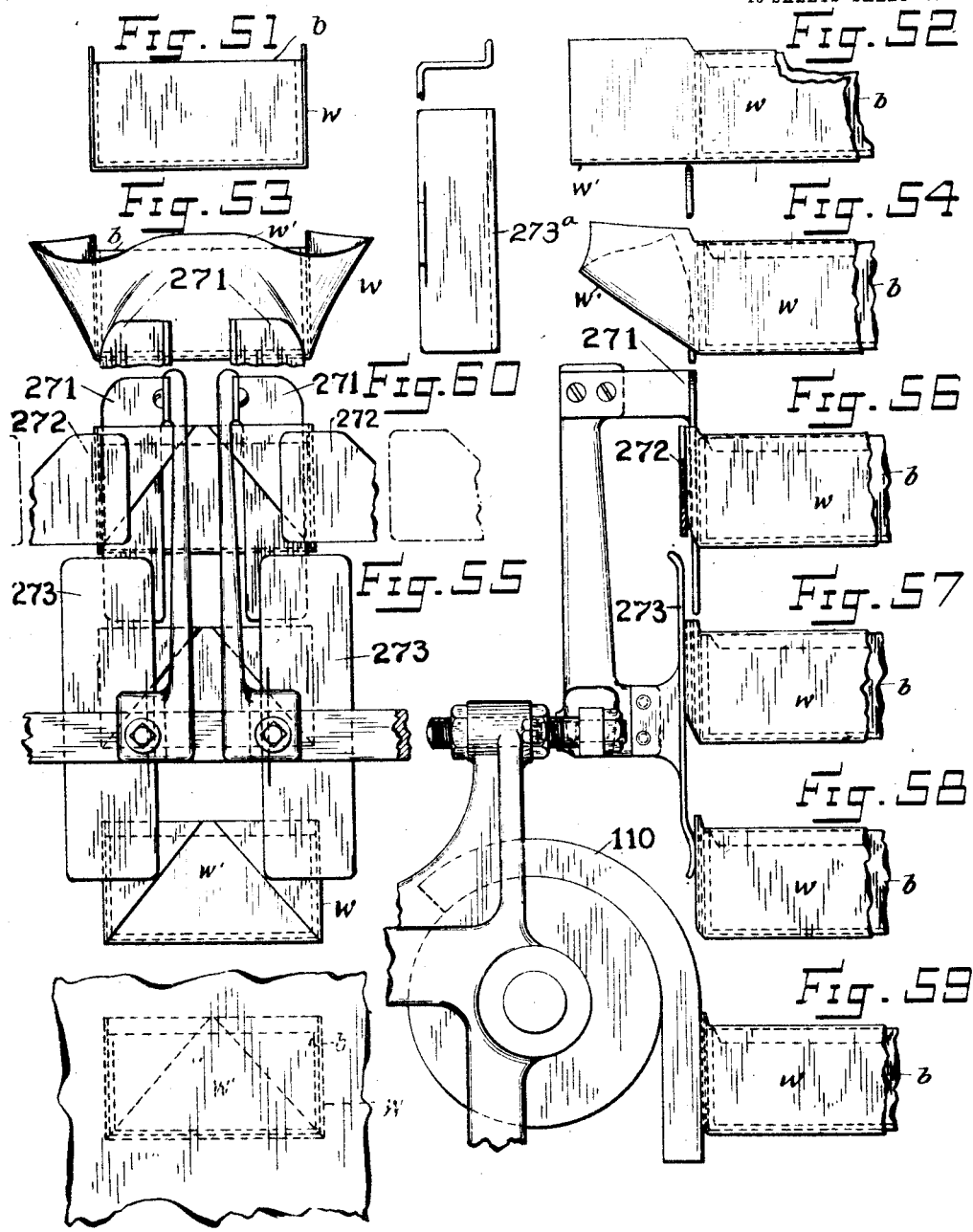

UNITED STATES PATENT OFFICE.

JOHN P. MARKERT, OF BROOKLYN, AND ROBERT STANLEY BOLGER, OF MORRIS PARK, NEW YORK; SAID BOLGER ASSIGNOR TO SAID MARKERT.

BOX-COVERING MACHINE.

1,065,330.  Specification of Letters Patent.  Patented June 17, 1913.

Application filed November 28, 1908. Serial No. 464,899.

*To all whom it may concern:*

Be it known that we, JOHN P. MARKERT, a citizen of the United States, residing at Brooklyn, Kings county, New York State, and ROBERT S. BOLGER, a citizen of the United States, residing at Morris Park, in the county of Queens and State of New York, have invented a certain new and useful Box-Covering Machine, of which the following is a specification, reference being had therein to the accompanying drawing.

This invention relates to box covering machines, the object of the invention being to provide a complete, practical machine which operates automatically upon the boxes fed thereto to apply the covers or wrappers to the boxes as they are successively fed through the machine which operates to carry the boxes one at a time through the regular course of travel through the machine from one element to another, the several elements acting successively on each box to press the cover or wrapper against the sides and ends thereof, tuck the edges of the wrapper or cover over the top edges of the box, press the cover over the extensions or shoulders of the boxes where they are provided with such, press the edges of the cover or wrapper against the inner surface of the sides and ends of the box, form thumb holes in the box and finally eject the boxes one at a time from the machine after the foregoing operations have been completed.

A further object of the invention is to provide a machine which is adapted to cover either plain boxes or boxes provided with necks and shoulders, and also boxes known to the trade as extension boxes or in other words, boxes with extension bottoms or flanges.

The machine is also adapted to affix wrappers or covers to what are known to the trade as non-set up boxes.

With the above and many other objects in view, the nature of which will more fully appear as the description proceeds, the invention consists in the novel construction, combination and arrangement of parts as herein fully described, illustrated and claimed.

Figure 46:
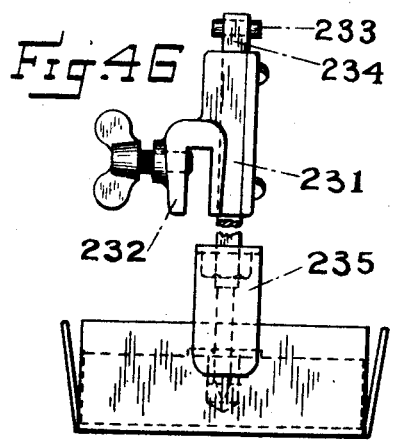
Figure 47:
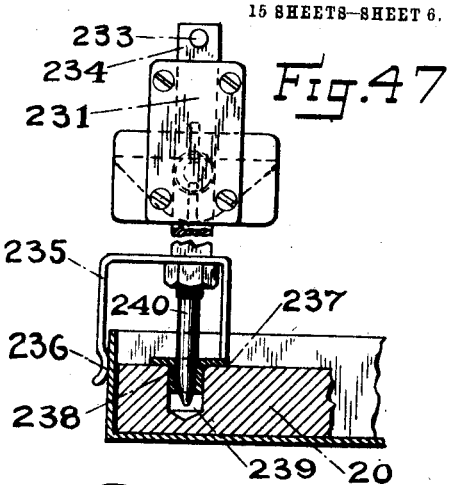
Figure 20:
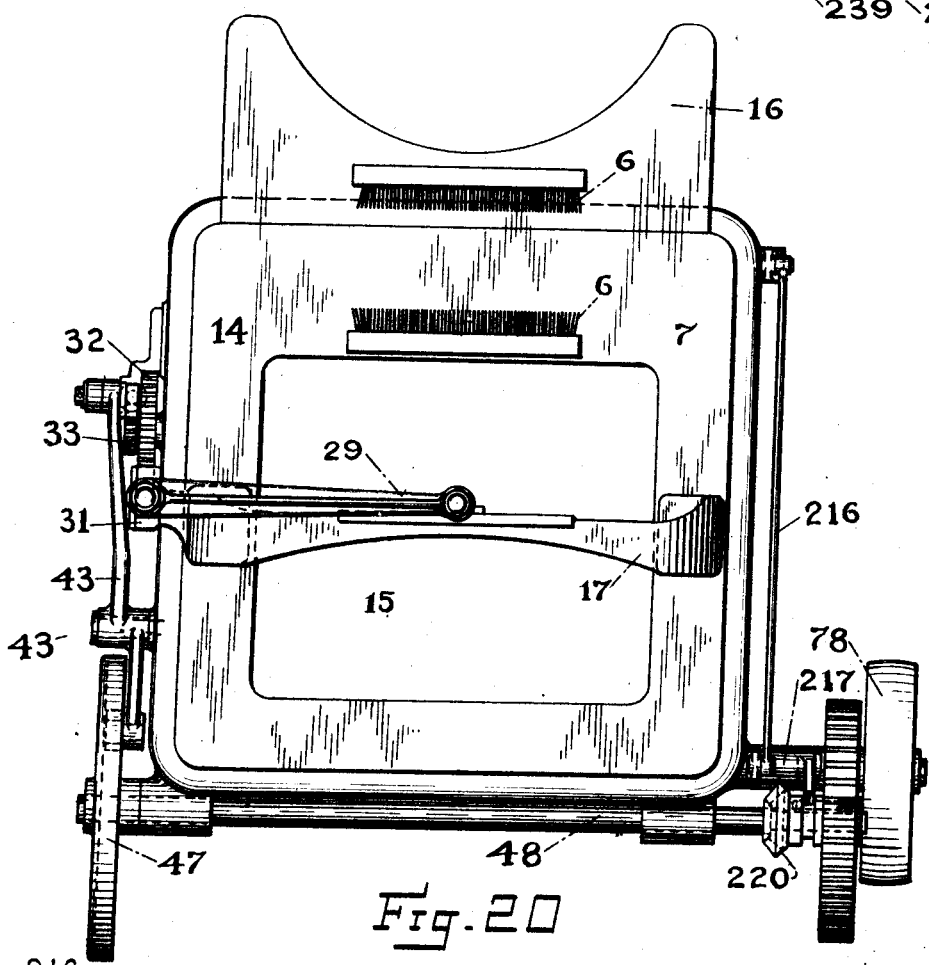

In the accompanying drawings:—Figures 1 to 8 both inclusive illustrate in perspective the successive steps or operations performed by the machine in affixing a cover or wrapper to an extension box or in other words, a box provided with a bottom flange. Figs. 9 to 16 both inclusive illustrate the same steps when employed in connection with the shouldered neck box. Fig. 17 is a side elevation of the machine, looking toward the right hand side of the machine. Fig. 18 is a side elevation of the machine, looking toward the opposite side from Fig. 17. Fig. 19 is a rear elevation of the machine. Fig. 20 is a plan view thereof. Fig. 21 is a vertical sectional view of the machine, taken on a plane running from front to rear, showing the sectional and extensible bottom plunger and also a portion of the top plunger. Fig. 22 is a plan view of the plunger elevating shaft and the counter-shaft and some of the connections. Fig. 23 is a view in elevation of a portion of the sectional bottom plunger, illustrating the catch and trip for the catch. Fig. 24 is an enlarged elevation of one of the upper units. Fig. 25 is an end view of the same. Fig. 26 is an enlarged sectional view of the presser pad driving mechanism. Fig. 27 is a plan view of one of the eccentric presser rolls and the parts associated therewith. Fig. 28 is an end view of the portion of the machine showing one of the eccentric presser rolls and some of the connections associated therewith. Figs. 29 to 32 both inclusive illustrate in cross section the steps of operation of the eccentric presser rolls in their relation to a shouldered neck box as the latter is fed through the machine. Fig. 33 is a vertical cross section taken on the line A—B of Fig. 26 looking in the direction of the arrow. Fig. 34 is also a vertical cross section through the same on the line C—D of Fig. 26, looking in the direction of the arrow. Fig. 35 is another similar section taken on the line E—F of Fig. 26 looking in the direction of the arrow. Figs. 36 to 41 both inclusive illustrate in cross section the steps of operation of the presser pads on an extension box as the latter is fed through the machine. Fig. 42 is a plan view of one of the tucker fingers, showing a portion of one of the finger bars and the manner of connecting the tucker finger to the finger bar. Fig. 43 is a rear view of the same. Fig. 44 is a vertical cross section through the same. Fig. 45 is a detail horizontal section illustrating the flexibility of the tucker fingers. Fig. 46 is an elevation of one of the removable end holders for non-set up boxes. Fig. 47 is a sectional view of the same taken at right angles to Fig. 46 and showing also a portion of a box and the plunger block in section. Fig. 48 is an elevation of the upper portion of the machine, showing the pick-off finger mechanism and the kicker mechanism. Fig. 49 is a plan view of the same, showing the top plunger in cross section. Fig. 50 is a detail vertical section through the plunger block, showing the means for connecting the same to the plunger head. Figs. 51 to 59 both inclusive illustrate the steps employed in forming an inverted fold to the end of a loose wrapped box. Fig. 60 is a detail view illustrating a presser plate of angle form. Fig. 61 is a plan view of an end tucker for shouldered neck boxes. Fig. 62 is an elevation of the same. Fig. 63 is a cross section through the same. Fig. 1$^a$ is a perspective view of a plain tight wrapped box. Fig. 2$^a$ is a similar view of a loose wrapped regular end fold box. Fig. 3$^a$ is a similar view of a loose wrapped inverted end fold box.

In illustrating the construction and operation of the machine contemplated in this invention, it has been found expedient to omit portions of the mechanism in some of the views in order that other portions of the mechanism may be more clearly shown.

The machine, as a whole, is adapted to apply and affix to boxes of several kinds and to boxes of widely varying shapes, dimensions and sizes, wrappers or covers either cut out in the form of blanks comprising side and end wings etc., as illustrated in Figs. 1 and 8 or plain wrappers which are designed to be folded and creased as they are applied and affixed to the boxes.

In Figs. 1 to 8 both inclusive, we have illustrated the steps carried out by the machine in applying a cut or formed up cover blank to an extension box which is illustrated at 1, 2 designating the extension or bottom flange thereof, while the wrapper or cover is shown as comprising a bottom or body portion 3, sides 4 and ends 5. The wrapper or cover illustrated in Fig. 1 is cut approximately in the way shown in said figure as to allow portions which will cover the bottom of the box, the flange or extension 2 and the sides and ends of the box and also leave projecting edges which are adapted to be tucked over the top edges of the box and pressed against the inner surface of the sides and ends thereof. In Fig. 1 the box is about to be applied to the top surface of the cover or wrapper, said surface having previously been gummed or pasted. This first step is usually performed by the operator or attendant who feeds the boxes to the machine. After the box is thus placed upon the cover or wrapper and allowed to adhere thereto, the box either plain or with shouldered neck with the attached cover or wrapper is pushed between oppositely arranged relatively adjustable wipe-on brushes 6 arranged at the top of the machine and adjacent to the feed table 7. The box is placed over the plunger block and then started on its way through the machine which, as will hereinafter appear, first operates to press the sides 4 of the cover over the extensions and against the sides of the box in the manner shown in Fig. 2. The next step that the machine performs is to tuck the edges of the sides over the top edges of the box as shown in Fig. 3, after which said edges are pressed against the inner surface of the box sides, constituting the next step as shown in Fig. 4. The next step consists in tucking in the end tabs of the sides 8 as shown in Fig. 5. This completes the application of the sides of the cover to the sides of the box. The next step is shown in Fig. 6 in which the ends 5 of the cover are pressed over the extension and against the ends of the box. The next step consists in tucking the top edges of the ends 5 over the top edges of the box ends as shown in Fig. 7, while the final step consists in pressing such edges of the cover against the inner surface of the box ends as shown in Fig. 8.

In Fig. 8 is shown a tight wrapped box in which the wrapper is applied in the same manner as is the wrapper on an extension box, except that a special form of presser roll is not required for applying the side and end wraps 4 and 5 to the box, as is necessary with extension boxes.

In Figs. 9 to 16 both inclusive, the same steps exactly are performed in connection with a box provided with a shoulder 9 and a relatively reduced neck 10. As the steps are precisely the same as those described and illustrated in Figs. 1 to 8 both inclusive, said steps need not be again enumerated herein.

Figs. 17, 18, 19 and 20 give the best general idea of the machine which, it will be noted, comprises a base 11 and a main frame extending upward therefrom and preferably embodying corner standards 12 connected by a top frame 13 upon which is supported and fastened a feed table 14 having a large central aperture 15 down through which the boxes are fed to the affixing and other operative elements of the machine. Extending off to the front side of the feed table is an extension board 16 in front of which the operator or attendant sits, the brushes 6 being arranged in convenient access to the operator while sitting at the machine so as to facilitate the primary step of wiping on the sides of the cover in the manner previously explained.

17 designates a bridge or arch which extends over the aperture 15 in the feed table and which embodies a guide 18 for the top plunger 19.

The top plunger 19 carries a plunger block 20, the shape of which is best illustrated in Figs. 48 and 49 wherein it will be seen that said block is substantially rectangular in plan with the corners thereof cut off as shown at 21, the object of which, as will hereinafter appear is to allow the pick off fingers to engage the corners of the box and hold the box while the plunger block is being withdrawn from the box.

In order to provide for attaching blocks of different thicknesses and sizes to the top plunger, the top plunger head 22 is provided at its lower end with a flange 23 having upstanding dowel pins 24 which are removably inserted from the bottom into the metal bushings 25 inserted and fixedly held in mortises 26 in the bottom of the plunger block 20 as clearly illustrated in Fig. 50. The plunger head is also provided with an adjustable clamp collar 27 held in place by means of a set screw 28 which binds against the plunger head and is adapted to hold the collar 27 tightly against the upper side of the plunger block 20. In this way the plunger block, no matter what its thickness may be, is confined between the flange 23 and the clamp collar 27. This provides for fastening a plunger block of any thickness to the plunger head, the thickness of the plunger block varying in accordance with the depth of the box, while the length and width of the plunger block will, of course, vary in accordance with the internal longitudinal and transverse measurements of the box being covered. In Fig. 19 a box 1 is shown placed upon the plunger block from the under side and in the same figure a wrapper or cover 3 is shown affixed to the bottom of the box, the parts referred to being in the initial position in readiness for the downward movement of the plunger which acts to feed the box and its cover into operative relation to and past the elements which perform the affixing operation. The mechanism for imparting the necessary throw or vertical reciprocatory movement to the top plunger 19 embodies an upper plunger operating arm 29 which extends off to one side of the machine where it is connected to a vertically reciprocating rack bar 30 movable in guides 31 secured to the machine frame as shown in Figs. 17 and 19. Meshing with the rack bar 30 is a multiplying gear comprising a larger gear wheel 32 and a smaller gear wheel or pinion 33 the same being fastened together for simultaneous rotation around a stud shaft 34. The larger gear 32 meshes with the rack bar 30 and the smaller gear or pinion 33 meshes with another rack bar 35 which also reciprocates vertically in a plane parallel to the plane of movement of the rack bar 30, the rack bar 35 working up and down through one or more guides 36 on the machine frame. Connected to the lower end of the rack bar 35 preferably by a screw threaded and adjustable connection 36' is a guide rod 37 which plays up and down through one or more guides 38 on the machine frame, said rod serving to guide the rack bar 35 and also adapting the throw of the rack bar 35 to be properly adjusted primarily or to compensate for wear by screwing the threaded end 36' of the rod 37 into or out of a threaded socket in the lower end of said rack bar 35 after which the adjustment may be fixed by means of a jam nut 38.

The rod 37 carries a collar 39 adjustable lengthwise thereof by means of nuts 40 threaded on the rod 37 above and beneath the collar 39. Pivotally connected to said collar 39 is one end of a pitman 41, the opposite end of which is pivotally connected at 42 to one arm of a cam-operated lever 43, the latter being fulcrumed at 44 on the machine frame while the other arm of said lever is provided with a roller 45 which travels in a cam groove 46 in a rotary cam 47, the latter being fast on one end of a cam shaft 48. It will now be understood that as the cam 47 revolves, the lever 43 is vibrated and acting through the pitman 41, imparts reciprocatory movement to the rack bar 35. By means of the multiplying gear above described, the rack bar 30 which is connected directly to the arm 29 which operates the top plunger is given a relatively accelerated movement. In this way the requisite amount of throw is obtained for the top plunger for the purpose of moving the box as it is being conveyed through the machine.

The bottom plunger comprises a platen 49 which is fastened upon the upper extremity of the upper section 50 of the bottom plunger. The plunger section 50 is provided with a rack face 51 and lateral flanges 52 which are received in corresponding recesses in the lower bottom plunger section 53 which is also provided with a rack face 54, which rack face is slotted or divided as indicated in Figs. 22 and 23, the rack face 51 of the upper section 50 lying between the divided portions of the rack face 54 of the lower section whereby the rack faces of both sections are adapted to be simultaneously engaged and driven by a broad faced pinion 55. Both the upper and lower rack faced sections of the bottom plunger are adapted to slide into a stationary guide or housing 57 having a bottom flange by which it is secured to the base 11 of the machine as shown in Fig. 21, said housing forming an effective guide for the bottom plunger in the up and down movements of the latter.

The bottom plunger is normally urged upward by the action of a plunger elevating shaft 56 upon which is fastened a gear wheel 57' which meshes with a smaller gear wheel or pinion 58 on a counter-shaft 59'. The broad faced pinion 55 is mounted fast on this counter-shaft 59'. The shaft 56 has fast thereon sprocket wheels 60 around which run chains 61 having interposed in their length, plunger elevating weights 62 the size of which is sufficient to impart movement to the chains 61 and rotate the shaft 56, causing a simultaneous rotation of the counter-shaft and the pinion 58, which results in elevating the bottom plunger. The chains 61 pass around idler sprocket wheels 63 at their lower ends and are also provided with tension devices or take ups 64 interposed in the length thereof and acting on the same principle as turn buckles.

In order to provide for the upper section 50 taking up the lower section 53 of the bottom plunger, said lower section is provided with an internal groove 64' extending lengthwise thereof in which travels a pin 65 projecting laterally from the lower end of the upper section 50 as shown in Fig. 23. When the pin 65 reaches the upper end of the groove 64' it meets the shoulder formed by the end wall of said groove and causes the upper section 50 to pull upward on the lower section 53. Just about this time the two sections are locked together by a catch 66 in the form of a pin which is pressed inward by means of a spring 67 so as to enter and engage a notch 68 near the lower end of the upper section 50, the said pin or catch thus serving to lock the two sections together. In order to again unlock said sections as the bottom platen and plunger descend, we provide a trip 69 having a limited vertical play by means of a slot 70 and locking screws 71, the said trip 69 being provided with a bevel nosed trip finger 72 which enters an opening 73 in the catch 66 and presses said catch outward against the tension of the spring 67 until the inner end of said catch is released from the notch 68. This permits the upper section of the bottom plunger to slide downward under the influence of the descending top plunger hereinabove described, which top plunger carries the box and presses the same against the platen 49 of the bottom plunger. The shafts 56 and 59 extend horizontally across the machine and are journaled in suitable bearings 74 and 75 on the machine frame. 76 designates collars on said shafts to prevent end play thereof.

The cam shaft 48 is driven by the main power shaft 77 provided with a belt-receiving pulley 78 at one end thereof, as shown in Fig. 19.

In order to provide for affixing the sides of the cover or wrapper, we provide what will be termed, upper oppositely arranged units, and for affixing the ends of the cover or wrapper to the box, we provide what will also be termed, lower oppositely arranged units. All of these units correspond in the main with each other, each unit carrying substantially the same elements. It will be observed that by reference to Figs. 17, 18 and 19, the upper pair of units are arranged at right angles to the lower pair of units, the upper pair or set of units being employed to affix the sides or cover of the wrapper to the box, while the lower pair of units are employed to affix the ends of the covers or wrapper to the boxes. One of the upper units is illustrated in detail in Figs. 24 and 25, wherein it is seen to comprise a frame embodying oppositely arranged sides 79. Journaled in the upper portion of each unit is the shaft 80 of an eccentric presser roll 81. The shaft 80 has its ends journaled in bearings 82 provided with stems 83 which extend horizontally and are inserted through eyes 84 at the top of the frame of the unit. Between each bearing 82 and eye 84 a spring 85 is disposed around the stem 83, said spring being utilized for pressing the eccentric roll 81 with the required tension against the box being operated upon. 86 and 87 designate adjusting and jam nuts threaded on the stem 83 in rear of the eye 84 for adjusting the position of the eccentric roll 81 for the purpose described. A portion of the eccentric roll is made solid as illustrated in Figs. 29 to 32 inclusive, in which said roll is shown enlarged in cross section while another portion of the roll is made yielding, consisting of a spring segment 88, one end of which is left free while the other end is secured to the solid portion of the roll by a screw 89 or other equivalent. Both the solid and the yielding portions of the roll are faced with flexible material as illustrated at 90, the said flexible or cushion faces being adapted to roll in contact with the cover or wrapper as the latter is applied to the box in the manner illustrated in Figs. 29 to 32 inclusive. Where the free end of the yielding section of the presser roll meets the solid or unyielding portion thereof, both portions are provided with metal faces 91 and 92 which permit the yielding portion to ride easily against the solid portion of the roll and increases the wearing properties of the roll.

The presser roll 81 is provided with reduced end portions in the form of split collars 93 having laterally projecting lugs 94 through which clamping bolts or screws 95 are inserted for the purpose of enabling the eccentric roll to be adjusted around the shaft 80 and clamp thereon when the necessary adjustment has been obtained. Connected to the shaft 80 is a crank arm 96 which extends the entire length of the presser roll 81 and beyond the ends thereof as shown in Fig. 27, the opposite extremities of said crank arm being provided with sleeves 97 which are split like the collars 93 and provided with lugs 98 through which are inserted clamping bolts or screws 99 whereby the crank arm 96 may be adjusted around the shaft 80 and secured at any desired point of adjustment. Centrally the crank arm 96 is provided with a presser foot 100 which is adapted to project and work beneath the platen 49, said presser foot being depressed by said platen as the latter moves downward. The platen thus, through the medium of the presser foot 100 and crank arm 96 imparts a partial rotary movement to the shaft 80 and the eccentric presser roll 81, causing the cushion face of the presser roll to work in contact with the cover or wrapper as illustrated in Figs. 29 to 32 inclusive. In Fig. 29 the presser roll is just about to come in contact with the cover or wrapper to press the same against the box. In Fig. 30, the presser roll has come in contact with the cover and is starting to press the wrapper on the box. In Fig. 31, the eccentric shoulder of the roller is shown operating on the wrapper or cover to press the same over the shoulder of the box, while in Fig. 32 the movement of the eccentric roll has been completed, the side portion of the cover or wrapper having been completely affixed to the box.

In order to provide for carrying the crank arm 96 and presser foot 100 out of the way to permit the further onward movement of the platen 49 and the box, a pinion 101 is mounted fast on the shaft 80 and meshes with and is actuated by a gear segment 102 on one arm 103 of an elbow lever, the latter being mounted on a shaft 104 on the unit frame, while the other arm 105 of said elbow lever is operated upon by a cam 106, the latter being fast on a cam shaft 107 journaled in bearings on the unit frame as shown in Fig. 24. In each complete rotary movement of the cam 106, a complete movement is given to the rack segment 102, which, in moving back and forth, rotates the presser roll shaft 80 first in one direction and then the other, the mechanism described being so timed as to carry the presser foot 100 into the path of the platen 49 at the proper time, and move said presser foot out of the way of the platen at the proper time so as to admit further onward and downward movement of the platen and the box. 108 designates a tension spring for holding the extremity of the arm 105 of the elbow lever in engagement with the cam 106. 109 designates a roller on the end of the arm 105 which moves in contact with a cam 106 to relieve friction as far as possible.

In addition to the eccentric presser roll above described, each unit is equipped with a presser pad the construction of which is best illustrated in Fig. 35 while the operation thereof is illustrated in Figs. 36 to 41 inclusive. This pad acts on the wrapper after the box leaves the eccentric presser roll, and like the eccentric presser roll is of a width adapted for use in connection with the widest standard box and is composed of some soft flexible material such as rubber, felt, or leather and in order to enable it to press the wrapper or cover either against the shoulder of a box or over the top edge of the box, it is provided at suitable points in its length with a transverse shoulder, 110 designating the presser pad and 111 the shoulder referred to. The presser pad travels around upper and lower drums 112 and 113, respectively mounted on shafts 114 and 115 one arranged above the other as shown in Figs. 33 to 35 inclusive the said drums being preferably mounted on ball bearings 116 traveling in ball cups 117 mounted on sleeves surrounding the shafts 114 and 115, referred to, as best illustrated in Fig. 26. The presser pad is carried around by means of parallel sprocket chains 118 certain opposite links of which are adapted to receive and carry a cross bar 119 to which one end of a pad is secured as best illustrated in Fig. 35 in which it will be observed that the cross bar 119 is provided with alternate grooves and ribs which interlock with corresponding ribs and grooves on the inner side of the end portion of the pad 110. Any suitable means may be utilized for securing the end of the pad to the cross bar 119 as by vulcanizing or other means.

The opposite end of the pad 110 is secured to another cross bar 120 by screws 121 or their equivalent and said bar 120 has attached thereto the ends of a number of tension springs 122 which at their opposite ends connect to a cross bar 123 secured at its opposite ends to opposite links of the chains 118. The presser pad is thus held under tension during its travel around the drums 112 and 113.

By reference to Fig. 26, it will be seen that the sprocket wheels 274 are secured to a sleeve 124 which is mounted upon another sleeve 125 and connected thereto by lock pins or keys 126. The sleeve 125 embraces a third or inner sleeve 127 and is adjustable thereon by means of a clamping bolt 128 which enables the presser pad 110 to be adjusted into proper time with the remainder of the mechanism of the machine to operate on the box at the proper moment. The sleeve 127 is secured by means of pins or keys 129 to collars 130 on the shaft 114, whereby all of said sleeves and sprocket wheels are caused to rotate with the shaft 114. In like manner the lower sprocket wheels 275 are connected fast by means of pins or keys 131 to a sleeve 132, the opposite ends of which are secured to collars 133 on the lower shaft 115.

On the shaft 114 there are also secured other sprocket wheels 134 around which run other sprocket chains 135 which pass around the other sprocket wheels 136 fast on the lower shaft 115. Connected to opposite links of the chains 135 are guides 137 having dove-tailed recesses or grooves 138 as shown at the upper left hand corner of Fig. 26, the said grooves receiving correspondingly shaped ribs 139 on arms 140. The arms 140 are formed on the upper ends of bell crank levers 141 which have a jointed connection with the opposite ends of a finger bar 142, the said bar extending entirely across the presser pad and having bearings 143 at the ends thereof which receive the pins or shafts 144 of the bell crank levers 141 referred to. The other or shorter arm 145 of each bell crank lever is provided at its end with a roller 146 which works against the edge of a vertically elongated cam 147 as best shown in Fig. 33, the cam 147 being so shaped along its outer edge or rim as to impart a rocking movement to the bell crank lever 141 as the latter is carried around by the chains 135. The pin or shaft 144 also carries a roller 148 which moves in the groove 149 of a second cam as best illustrated in Fig. 33 wherein it will be observed that the groove 149 is provided with raised and sunken portions operating on the roller 148 so as to divert the same from a true elliptical path or the path in which the chains 135 travel. The finger bar 142 carries a tucker finger 150 which is formed of spring metal, the same being illustrated in detail in Figs. 42 to 45 inclusive, while the relation of said finger to the finger bar is clearly illustrated in Fig. 36 for example, wherein it will be observed that the free edge of the finger lies normally in close proximity to the working face of the presser pad 110. In Fig. 36 it will be observed that the end cross bar 119 is just acting on the wrapper or cover to press the same over the extension bottom of the box. In Fig. 37 the pad has pressed the side of the cover against the side of the box and the free end of the tucker finger 150 has just reached and is touching the cover and folding the same over the top edge of the box. At this point the roller 148 passes over a hump or raised portion or lip 152 of the cam 149 and about the same time or a short time thereafter, the roller 146 is operated upon by the similar projection or outward diversion 151 of the cam 147. The effect of this is to move the free end of the tucker finger 150 away from the face of the presser pad as shown in Fig. 38. Just a little farther on in the movement of the finger bar, the inward deflection of the cam 147 at the point 153 and the similar inward deflection of the cam groove 149 at the point 154 causes said tucker finger to exert a pressure against the inturned portion of the wrapper or cover and sliding down thereon to press the cover against the inner surface of the box in the manner illustrated in Fig. 39. Upon a further downward movement of the parts, the roller 148 moves onto a rise 155 in the cam groove 149 with a result that the finger 150 is moved away from the working face of the presser pad so as to clear the inner surface of the box as shown in Fig. 40. Then, as the presser pad starts around the lower drum and recedes from the box, the tucker finger 150 is lifted out of the box as shown in Fig. 41 or conversely the box moves away from and out of contact with the finger, the box then moving on to the lower set of units, which subsequently act on the opposite ends of the box in a similar manner to that hereinabove described.

The construction of each of the tucker fingers is illustrated in Figs. 42 to 45 inclusive in which it will be seen that the free edge of the finger is slit backward as shown at 156 to allow of the necessary flexure of the finger as a whole as illustrated in Fig. 45 wherein a portion of the finger is seen to have come in contact with a projection on the inside of the box formed by a small lump of paste or other foreign matter finding its way under the cover or wrapper. The finger is also provided with an angular flange 157 extending over the outer edge of the finger bar 142 as shown in Figs. 43 and 44, said flange being provided with key hole slots 158 adapted to receive screws 159 the heads of which are adapted to pass through the larger portions of the slots 158 and clamp the flange against the finger bar when the finger is slid in the direction of the slots 158 as will be readily apparent in Fig. 43. The body portion of the tucker finger 150 is likewise provided with key hole slots 160 having a general T-shape while the finger bar is provided on the adjacent side with headed studs 161 the heads of which are adapted to pass through the larger portions of the slots 160 in applying the finger to the finger bar or separating said parts. This mode of fastening is employed to facilitate the application to the finger bar and the removal therefrom of tucker fingers of different dimensions adapted to boxes of corresponding dimensions. It is also preferred to provide each tucker finger with a corner toe or lip 162 which operates as shown in Fig. 45 to press the cover or wrapper well into the inner corner or angle of the box.

In order to insure the accurate operation of the bell crank levers 141 and the movements of the tucker fingers 150, a yielding connection is made between the outwardly projecting arm 141 of each bell crank lever and the finger bar 142. This is accomplished as shown in Figs. 26 and 33 by providing the arm 141 with a tubular extension 163, in which is arranged a small spiral spring 164 and also one end of a pin 165 which bears against an upwardly projecting shoulder or ear 166 on the adjacent ends of the finger bar 142 as shown in Fig. 26. The spring 164 operates to hold the roller 146 in contact with the rim or outer edge of the cam 147.

In order to preserve the proper tension of the sprocket chains 118 and 135, the lower shaft 115 has its ends journaled in vertically slidable bearing boxes 167 which, as shown in Fig. 25 are movable up and down in slots 168 in the sides of the unit frame, each of said boxes being equipped at opposite sides with adjusting screws 169 and jam nuts 170 the screws 169 bearing against the opposite upper and lower ends of the slot so that by turning said screws, the boxes 167 may be slid upward or downward to place said sprocket chains under the necessary tension.

The mechanism for forming the thumb holes in the box is illustrated in Figs. 24 and 25, said mechanism comprising a shaft 171 journaled in bearings on the unit frame as shown in said figures, said shaft having mounted thereon sleeves 172 provided with downwardly extending arms 173 which are connected by links 174 to a slide 175 which works under guide lips 176 on the sides of the unit frame as shown in Fig. 24 and above the bottom supporting plate 177 which connects the lower ends of the sides 79 of the unit frame. One of the sleeves 172 is provided with a shorter arm 178 which carries a roller 179 that is acted upon by a cam 180 on the cam shaft 107 above referred to. The arms 173 are thus swung back and forth carrying with them and actuating the slide 175 in a corresponding direction.

Mounted upon the slide is a thumb holer illustrated in Figs. 24 and 25, wherein it is seen to comprise a tubular casing 181 having a beveled end or nose portion 182 and a notch 183 adapted to receive the upper edge of the box, the thumb holer being pivotally mounted at 184 to permit the beveled nose 182 to ride over the top edge of the box and allow the edge of the box to enter the notch 183. At the proper moment, a cutter 185 which reciprocates within the tubular casing 181 is actuated across the notch 183, removing a portion of the edge of the box in the form of a semicircle and forming the usual thumb notch or hole. The thumb holer is pivotally mounted at the point 184 on the upper end of a vertically adjustable stem or spindle 186 which passes through an opening in the slide 175 and may be fastened at any point of adjustment up and down by means of set screw 187. The rear end of the cutter 185 projects beyond the corresponding end of the casing 181 as shown in Fig. 25 and is provided with a contact head 188 between which and the casing 181 there is interposed a cutter retracting spring 189. The cutter 185 is thrust forward at the proper moment by means of a thumb holer lever 190 which is carried by a sleeve 191 mounted loosely on the rock shaft 171 and provided with a shorter arm 192 which carries a roller 193 that is acted upon by a cam 194 on the cam shaft 107. The cam shaft 107 is provided at one end outside of the unit frame with a worm gear 195 which meshes with and is actuated by a worm 196 on the unit or drive shaft 114. The shaft 114 is provided with a spline 198 which enables the unit to be slid lengthwise thereof while causing the worm 196 to turn with the shaft 114. Connected to the worm 196 and rotating simultaneously therewith is a miter gear 199 meshing with another gear 200 on the shaft of the upper presser pad drum. In this way the shaft 114 imparts motion to all of the mechanism of the unit and by reference to Fig. 18 it will be observed that the shaft 114 extends entirely across the machine and simultaneously operates the opposite upper units. By reference to the same figure, it will be noticed that the units are provided with sleeves 209 which embrace supporting rods or shafts 202 which also extend entirely across the machine frame thus steadying the units in their movements toward and away from each other. Each of the rods 202 is provided with a rack face 203 adapted to be engaged by a pinion 204 on an adjusting shaft 205, the end of said shaft being preferably squared as shown at 206 to receive a suitable wrench whereby said shaft may be turned for the purpose of moving the oppositely located unit frames 79 to the desired extent toward and away from each other according to the dimensions of the box being operated upon by the units. The shaft 205 is journaled in bearings on the unit as shown in Figs. 24 and 25. When the desired distance between the units has been adjusted, the units may be clamped to the shafts or rods 202 by means of clamp screws 207 which pass through the divided portions 208 of the bearings 209 which hold the rod or shaft 202.

Mounted on the upper side of the slide 175 are inwardly extending end tuckers 210 which are mounted on and carried by brackets 211 adjustably mounted on the slide 175 by means of bolts or screws 212 enabling said end tuckers to be set up toward or farther away from each other according to the dimensions of the box operated upon, the said tuckers serving to tuck in the end tabs of the side portions of the cover or wrapper where the same pass around the corners of the box as shown in Figs. 5 and 13.

The lower units, which operate on the ends of the box, are practically duplicates of the upper units but operate at right angles to the upper units and do not comprise the thumb holing devices and the end tuckers hereinabove described in connection with the upper set of units. In all other respects, however, they substantially correspond with the upper set of units so that in the passage of a box through the machine, the sides are first operated upon by the upper units and thereafter the ends of the box are operated upon by the lower set of units.

213 (Fig. 18) represents a foot-operated starting lever which operates through suitable connections 214, 215 and 216 upon a clutch lever 217 which acts to clutch and release an element of the driving mechanism to enable the machine to be started as soon as a box has been placed over the plunger block of the top plunger as hereinabove described.

218 (Fig. 19) designates a vertical transmission shaft which is provided at its lower end with a miter gear wheel 219 driven by a corresponding gear wheel 220 on the shaft 48 hereinabove described. The transmission shaft 218 is further provided with other miter gears 221 and 222 at suitable points thereon, which mesh with the unit driving shafts 197 also hereinabove described. In this way motion is simultaneously imparted to the mechanism of each unit.

In order to prevent the marginal portions of the wrappers or covers from curling over and depositing paste on the eccentric presser rolls and presser pads, I provide L-shaped guards 223 having hooked inner ends 224 which extend inward over the presser rolls and presser pads as shown in Figs. 19, 24 and 25, the hooked extremities 224 serving to catch and arrest the downward movement of such portions of the covers or wrappers before they touch the eccentric presser rolls and presser pads. In order to move the guards out of the way to allow a box to move downward between the opposite presser rolls and presser pads, said guards are mounted on guard-operating levers 225 fulcrumed on the shaft 171 at the point 226, said levers being normally held inward by means of contractile springs 227 and being pressed outward by cams 228 on the cam shaft 107 as shown in Fig. 24. Each of the guards 223 is provided with a slotted shank 229 which is secured by a bolt or other suitable fastener 230 to the free end of the lever 225, the construction referred to admitting of the necessary up and down adjustment of the guard to bring the hooked edge or extremity thereof into proper relation to the eccentric presser roll and presser pad in conjunction with which it operates.

In affixing wrappers or covers to non-set up boxes, I employ the holding devices illustrated in Figs. 46 and 47 wherein I have shown guides 231 adapted to be fastened by means of clamps 232 on the bridge or arch 17 at the top of the frame of the machine. Sliding through the guide 231 is a vertically movable bar 234 provided at or near its upper end with a stop 233 which comes in contact with the guide 231 to limit the downward movement of said slide bar. At its lower end said slide bar carries a spring finger 235 which is adapted to bear against one side or one end of the non-set up box as shown at 236, the latter being placed over the top plunger block 20. The finger 235 is substantially U-shaped, the inner arm of said finger serving to come in contact with the top flange 237 of a metal bushing 238 which is inserted and held in a socket 239 in the block 20 as shown in Fig. 47, said bushing being provided with a hole to receive the pointed lower extremity 240 of the slide bar 234 as clearly shown in Fig. 47. It will be understood that two or more of these holding fingers 235 and the parts connected therewith are employed to hold the unbound sides and ends of a non-set up box in proper position upon the top plunger block 20 preparatory to the affixing of the wrapper to the box in its movement through the machine. The rods holding these non-set up box-holding fingers are of a length to travel with the box down to the point where the end tuckers have tucked the end tabs to the ends of the boxes. At this point the pins at the top of the arms hold the rods stationary until the return of the plunger with the completely covered box and as the plunger block comes in contact with same, serves as a means for bringing the fingers back to their operative position for the next box.

The kicker mechanism, or in other words, the means for moving the box out of the way after the affixing operation has been completed and also the pick-off mechanism for detaching the box from the plunger block is illustrated in detail in Figs. 48 and 49 wherein it will be observed that the covered box has about reached the upper limit of its movement.

The mechanism herein referred to comprises a head frame 241 embodying a vertical guide 242 through which moves a vertical slide bar 243 having pins 244 and 245 for raising and lowering the cross head 246. Pivotally mounted on opposite sides of the cross head 246 are downwardly diverging links 247 which connect at their lower ends to arms 248 extending outwardly from a pair of oppositely arranged parallel rock shafts 249 journaled at their opposite ends in the head frame 241. Extending downward from the shafts 249 and fast thereon are other arms 250 provided with sleeves 251 in which are secured oppositely extending pick-off arms 252. On the arms 252 are mounted sleeves 253 which are adjustable lengthwise of the arms 252 by means of set screws 254. The sleeves are provided with downwardly extending pick-off stems 255 which carry pick-off fingers 257 held by set screws 256 and adapted to project inward over the corners of the box as shown in Fig. 49 so as not to come in contact with the beveled or cut away corners of the plunger block 20 as shown in the same figure. When the pick-off fingers are in the position shown in Figs. 48 and 49, they catch the corners of the box in the upward movement thereof and prevent further upward movement of the box while allowing the plunger block to continue its upward movement until it is withdrawn from the box. Then the kicker comes into operation, the same comprising a kicker head 258 carried by the inner end of a kicker stem 259 adjustable up and down in a sleeve 260, the latter being provided at its upper end with a collar 261 adapted to be clamped by a set screw 262 at any point in the length of a horizontally disposed kicker rod 263 which is slidable lengthwise in a tubular guide 264 carried by the adjacent rock shaft 249. Within the guide 264 there is arranged a contractile spring 265 which acts to move the kicker rod 263 quickly inward and cause the head 258 to strike against the adjacent side of the box and kick the same out from under the plunger block 20. If desired, this may be done with sufficient force to eject the box from beyond the machine frame and cause it to fall into a suitable receptacle placed there to receive it. When the pin 245 strikes against the cross head 246, it lifts said cross head and pulling upward on the links 247 rocks the shafts 249 and swings the kicker and pick off finger arms upward from the full line position of Fig. 48 to the dotted line position thereof, thus leaving ample room for the operator to place another box over the top plunger block. When the pin 244 moves downward into contact with the cross head 246, it depresses said cross head and thereby restores the pick-off fingers to their operative position illustrated in full lines in Fig. 48. The shafts 249 are provided at their adjoining ends with cranks 266 the ends of which are connected by a detainer spring 267 which acts to hold the rock shafts either in the full line position of the parts shown in Fig. 48 or in the dotted line position shown in the same figure until the tension of said spring is overcome by the action of the pins 244 and 245 acting against and moving the cross head 246. The rocking movement of the shafts 249 may be limited by pins 268 coöperating with oppositely located lugs or shoulders 269 on the cranks 266 as shown at the right hand end of Fig. 49. The spring 265 is so arranged in connection with a projection on the adjacent rock shaft 249 that it is placed under compression by the rocking movement of the shaft 249, in readiness to reciprocate the kicker rod 263, the inner end of which bears against one side of the slide bar or top plunger as shown in Fig. 48, the lower end of said plunger being cut away as shown at 270 so that when the plunger approaches the upper limit of its movement and the plunger block 20 is clear of the box, the inner end of the kicker rod is released and moves across the cut away portion 270 of the plunger thereby causing the head of the kicker to push the box from under the plunger block.

The inverted wrap is covered loose on the box with the turned-in portion only attached to the inside of the box, with adhesive. The attachments for these ends are slidably mounted on a crossbar, housed in the bearings of the eccentric rollers operating on the lower set of units but are not used on boxes on which the eccentric rollers are used, hence the two never interfere.

Fig. 51 shows a box $b$ having the wrapper or cover $w$ attached to the long sides or the sides operated upon by the primary set of presser pads and shown more clearly in Fig. 52.

Figs. 53 and 54 show the end folders 271 just about to act upon the ends $w'$ to fold the wrapper against the plain surface of the end of the box, and Figs. 55 and 56 show the fold imparted to the ends after the end tuckers 272 have performed their function.

Figs. 57 and 58 show a shield 273 which serves to hold the folded ends in their folded position until the box is about to enter the lower set of presser pads to be operated upon by the turn in fingers to complete the turn in and attaching of the wrap to the inside of the box, the finished box being shown in Fig. 3$^a$.

Fig. 60 shows an angle plate 273$^a$ which is used in place of plate or shield 273 for holding the end folds of inverted wrap boxes, and the said plate acts to hold one plane surface on the end and the other on the side of the box to prevent the inverted wrap from withdrawing while traveling to the lower set of presser pads. The plate 273 is used on the regular fold loose wrap end boxes (see Fig. 2$^a$). The arms which hold these plates are movable toward and away from each other according to the width of the box operated on.

In wrapping the wrapper $w$ to produce the box shown in Fig. 2$^a$, the end folders 271 are not used but the end tuckers 272 act on the ends of the wrapper and fold inwardly the portions $w^2$, Fig. 2$^a$, and then the members 273 fold up the portion $w^3$ against the portions $w^2$ and ends of the box, after which the edges of the wrapper are folded inwardly and are attached to the inside of the box.

From the foregoing description it will be understood that the only preliminary step which is to be taken by the operator or attendant is to place a non-covered box accurately upon the gummed side of the cover or wrapper and press the box between the wipe-on brushes, then place the box over the plunger block. These brushes are not used in wrapping extension edge boxes. The operator then presses upon the starting treadle or lever, after which the machine operates automatically to wipe on the sides and end of the cover, tuck the same around the corners of the box and over the top edges thereof and press the edge of the cover against the inner surface of the box. The machine then operates to pick the box off the plunger and off the plunger block and thrust the same out from beneath said block as the plunger moves on upward, the machine stopping automatically just at this time in readiness for the application of another box to the plunger block after the pick-off and kicker elements have been raised to the dotted line position.

The wrapper or cover wrap has the adhesive applied to the extreme edge and is then placed on the bottom plunger platen, being fed to the guides on one side and one end of the machine; the box is then placed over the top plunger block and the machine is started, after which the several machine operations are identical with those used in applying wrappers to the tight wrapped boxes. The wipe on brushes are not used on extension edge or loose wrapped boxes.

Figs. 61, 62 and 63 show a double blade end tucker which has the offset blade 274' on the inside adjustably attached to the main or bottom blade 275' to move up and down according to the height of the shoulder on the box upon which the same is to operate. When operating on boxes other than the shoulder style, the offset blade 274' is detached as but one blade is necessary on all other styles of boxes. A blade spring 276 is attached to these end tuckers. Each tucker has one of these springs 276 which projects a trifle beyond the tuckers when in its normal operative position. In non set-up boxes the wrapper is attached to the side of the box by the upper set of units and after passing the same the sides have no support as the end tuckers have not come into action up to that time, but as they do the springs 276 engage the sides of the box and raise them to their upright position and at this moment the end tuckers continue in their movement and attach the tabs and immediately recede from such position to their next operative position for a succeeding box. The end tuckers are also intended to be adjustable toward and away from the center of the machine in addition to the adjustment brought about by the presser units upon which they are mounted.

We claim:—

1. A box covering machine comprising means for causing movement of the box in a rectilinear path, cover affixing presser pads operating to press the covering material on the box, endless carriers by which said presser pads are carried and caused to travel along and in contact with the box in planes parallel to the direction of the box's movement, and other cover-affixing members at right angles to the first affixing members.

2. A box covering machine comprising means for causing movement of the box in a rectilinear path, presser pads for affixing the covering material to the box, endless carriers by which said presser pads are carried and caused to travel in the direction of the box's movement, and other affixing presser pads at right angles to the first affixing presser pads operating on the cover after the box has passed beyond the first affixing presser pads, the cover affixing presser pads remaining in contact with the box while traveling along with the box.

3. A box covering machine comprising means for causing movement of the box, cover-affixing presser pads for pressing the covering material on the box, means for causing said pads to travel in the direction of the box's movement, other cover-affixing presser pads traveling also in the direction of the box's movement but at right angles to the first affixing members, and endless carriers for the pads.

4. A box covering machine comprising oppositely arranged presser pads for affixing the covering material to the box, means for causing said pads to travel in the direction of the box's movement while pressing the covering material in full contact therewith, means for positioning the presser pads with relation to the box, and means controlling the operation of the machine adapted to feed the box along in a rectilinear path and move the presser pads through one cycle of operation.

5. A box covering machine comprising oppositely arranged presser pads for affixing the covering material to the box, means for causing said presser pads to travel in planes parallel to the direction of the box's movement while remaining in contact therewith, and means for feeding the box along in a rectilinear path in contact with said presser pads while the latter press the covering material upon the box.

6. A box covering machine comprising presser pads for affixing the covering material to the box, means for causing said presser pads to travel in the direction of the box's movement, endless carriers for said pads, means for positioning said pads with relation to the box, and means controlling the operation of the machine adapted to feed the box along in a rectilinear path between the affixing pads.

7. A box covering machine comprising presser pads for affixing the covering material to the box, means comprising endless carriers for causing said presser pads to travel in the direction of the box's movement, other affixing presser pads at right angles to the first presser pads, and means controlling the operation of the machine adapted to feed the box along past the first set of presser pads, and then past the second set during one cycle of operation of the machine.

8. A box covering machine comprising a plurality of sets of presser pads for pressing the cover material on the box, endless carriers for the pads, and means controlling the operation of the machine adapted to feed the box along between the presser pads and actuate one set of presser pads, and then the succeeding set of presser pads through one cycle of operation of the machine.

9. A box covering machine comprising oppositely arranged units each embodying an endless carrier, a presser pad, a movable unit frame for each set of said members, driving mechanism on each of said unit frames, and means including a rotatable shaft for moving said frames toward and away from each other without disturbing the driving mechanism.

10. A covering machine for boxes comprising frame sections, endless carriers, presser pads carried thereby at right angles to each other and adapted to travel along with the box, and adjusting means including a rotatable shaft for moving said pads and frame sections toward and away from a common center.

11. A box covering machine comprising oppositely arranged presser units each embodying an endless carrier, a cover affixing presser pad adapted to travel along with the box, driving means therefor, and means including a rotatable shaft acting to adjust the opposite units to move the same toward and away from a common center without disturbing the driving mechanism.

12. A box covering machine comprising oppositely arranged presser units each embodying an endless carrier, a cover affixing pad attached to said carrier, means for placing said pad under tension on the carrier and driving means for said pad.

13. A box covering machine comprising oppositely arranged presser units each embodying an endless carrier a cover-affixing pad attached to said carrier a shoulder on said pad, means for adjusting said units toward and away from a common center, box-advancing mechanism, and means for driving the cover-affixing pads to present the shoulders to the box in accordance with the movement of the box.

14. A box covering machine including a presser roll consisting of a cushion-faced solid section and a cushion-faced yielding section having the portion of maximum yielding effect meeting the first-mentioned section to permit the edge of the solid section to apply a wrapper to the shoulder of a box while the yielding section is in contact with the wrapper.

15. A box covering machine including a presser roll consisting of two cushion-faced portions, one portion being yielding and having its edge permanently in engagement with the edge of the other portion whereby both edges simultaneously act above and below the shoulder of a box in applying a wrapper thereto.

16. A box covering machine including a presser roll consisting of a yielding and a non-yielding portion having contiguous edges, the yielding portion being normally eccentric to the non-yielding portion to form a longitudinal shoulder for pressing a wrapper on the shoulder of shouldered neck boxes.

17. A box covering machine comprising means for moving the box in a rectilinear path oppositely arranged presser rolls, and means projecting beyond the plane of the periphery of said rolls and located in the path of movement of the box operating to turn said rolls to press the cover against the box.

18. A box covering machine comprising means for moving the box in a rectilinear path oppositely arranged presser rolls, and an operating arm connected with each roll and having a portion thereof projecting beyond the periphery of the roll and located in the path of movement of the box, said arms operating to turn the rolls to press the cover against the box.

19. A box covering machine comprising oppositely arranged presser rolls each having a yielding portion, an operating arm on the shaft of each roll arranged to project beyond the periphery of the roll in the path of movement of the box, and a box carrying plunger element adapted to contact with said arms causing the rolls to press the cover against the box.

20. A box covering machine comprising a box platen oppositely arranged presser rolls, each having a yielding portion an operating arm for each roll arranged to project beyond the periphery of the roll in the path of movement of the box platen which acts on the arms to turn the rolls, and means for moving said arms out of the way during another portion of the movement of the platen.

21. A box covering machine comprising a box platen oppositely arranged presser rolls, each having a yielding portion an operating arm for each roll arranged to project beyond the periphery of the roll in the path of movement of the box platen which acts on the arms to turn the rolls during one portion of the stroke of the platen, and means for moving said arms out of the way during the return stroke of the platen.

22. A box covering machine comprising a box platen oppositely arranged presser rolls, each having a yielding portion an operating arm for each roll arranged in the path of the box platen for actuation thereby to turn the rolls, and cam controlled means for shifting said arms out of the path of the box platen during a portion of the platen movement.

23. A box covering machine comprising a presser element having a yielding section with a cylindrical face and a shoulder adapted to automatically vary in depth under differential pressure whereby the roll is adapted to operate on shouldered neck boxes both above and beneath the shoulder.

24. A box covering machine comprising a presser element having a shoulder defined along one side by a yielding cylindrical surface adapting the roll to operate on shouldered neck boxes, both above and beneath the shoulder.

25. A box covering machine comprising presser roll having a yielding face and a shoulder, a shaft for said roll, and a roll-operating arm adjustable on the shaft concentrically with the roll.

26. A box covering machine comprising a presser roll having a yielding cylindrical face and a shoulder, a shaft at the center of said roll and a roll-operating arm on said shaft, said roll being thereby adapted to operate on shouldered neck boxes both above and beneath the shoulder.

27. A box covering machine comprising presser roll having a shouldered face, a roll-operating arm having an adjustable clamped connection with said roll, and a shaft on which both the roll and its operating arm are adjustably mounted.

28. A box covering machine comprising a cover-affixing member embodying a flat flexible pad and a pair of shafts around which said pad has a continued movement in the direction of travel of the box, and means for moving the box along in contact with the pad, said pad having a shoulder adapted to press the cover wrap against a corresponding shoulder on the box.

29. A box covering machine comprising a cover-affixing member embodying a flat flexible pad and a pair of shafts around which said pad has a continued movement in the direction of travel of the box, another such affixing member facing the first affixing member, and two other affixing members at right angles to the first two, and means for moving the box along in contact with the pads.

30. A box covering machine comprising a cover-affixing member embodying a flat flexible pad and a pair of shafts around which said pad has a continued movement in the direction of travel of the box, and means for moving the box along in contact with the pad, said pad having a shoulder adapted to press the cover wrap against a corresponding shoulder on the box, another affixing member facing the first affixing member, and two other affixing members at right angles to the first two.

31. A box covering machine comprising a flat flexible presser pad and a pair of shafts around which said pad has a continued movement in the direction of travel of the box, another presser pad facing the first presser pad, two other presser pads facing at right angles to the first two, and means for moving the box along in contact with all of said pads.

32. A box covering machine comprising a cover-affixing member embodying a flat flexible pad and a pair of shafts around which the pad has a continued movement in the direction of travel of the box, and means for moving the box along in contact with the pad, said pad having a shoulder adapted to press the cover wrap against a corresponding shoulder on the box, another such affixing member facing the first affixing member, and two other affixing members at right angles to the first two.

33. A cover affixing member for a box covering machine comprising an endless carrier embodying a pair of endless chains, and a presser pad supported between said chains and carried thereby.

34. A cover affixing member for a box covering machine comprising an endless carrier embodying a pair of endless chains, transverse bars connecting opposite links of the chains, and a presser pad connected with said bars.

35. A cover affixing member for a box covering machine comprising an endless carrier embodying a pair of endless chains, transverse bars connecting opposite links of the chains, a presser pad connected with said bars, and means for securing the pad to said bars, embodying in part an enlargement on the forward bar entering the body of the pad.

36. A cover affixing member for a box covering machine comprising an endless carrier embodying a pair of endless chains, transverse bars connecting opposite links of the chains, a presser pad connected with said bars, and means for securing the presser pad to said bars embodying dovetail connections between the pad and rods.

37. A box covering machine comprising an endless carrier, shafts around which said carrier moves, and a presser pad having a yielding connection with said carrier.

38. A box covering machine comprising an endless carrier, shafts around which the carrier moves, and a presser pad made fast at one edge to the carrier and yieldingly connected at its opposite edge to the carrier.

39. A box covering machine comprising parallel chains, wheels around which the chains run, cross bars connecting the chains, and a presser pad having opposite portions thereof attached to said cross bars.

40. A box covering machine comprising parallel chains, wheels around which the chains run, cross bars connecting said chains, a presser pad attached at one edge to one cross bar, and a tension element connecting the opposite edge of the pad to another cross bar.

41. A box covering machine comprising mechanism for feeding a box along while being covered, a tucker, means for advancing the tucker substantially at right angles to the side of the box to be covered, and means for turning the tucker while advancing so that it will press the margin of the cover on the box while traveling along with the box being covered.

42. A box covering machine comprising mechanism for feeding a box along while being covered, a tucker, means for advancing the tucker substantially at right angles to the side of the box to be covered, means for turning the tucker while advancing so that it will travel along with the box being covered, and means for holding the tucker in contact with the box's side while traveling along with the box.

43. A box covering machine comprising mechanism for feeding a box along while being covered, a tucker, and means for advancing the tucker substantially at right angles to the side of the box to be covered, and turning said tucker so as to follow and travel along with the box being covered, a presser pad, and means for causing said pad and tucker to travel in contact with the box being covered.

44. A box covering machine comprising mechanism for feeding a box along while being covered, a tucker, and means for advancing the tucker substantially at right angles to the side of the box to be covered and turning said tucker so as to cause it to travel along with the box being covered and bear against the box's side after the tucking operation, and a movable pad, also adapted to travel along with and in contact with the box being covered.

45. A box covering machine comprising means for feeding a box along in a rectilinear path, and cover applying mechanism embodying means moving along in planes parallel with the direction of movement of the traveling box and exerting pressure to press the covering material simultaneously on two opposite sides of the box, and means acting subsequently and similarly to press the covering material on the other two opposite sides of the box.

46. A box covering machine comprising means for feeding a box along in a rectilinear path, and cover applying mechanism embodying means moving along with the box and acting to simultaneously press the covering material on opposite sides of the box and also means for tucking in the flaps of the cover blank and pressing the same against the inner surface of the box.

47. A box covering machine comprising means for feeding the box along in a rectilinear path, and cover applying mechanism embodying means moving along with the traveling box operating to press the covering material on the box and tuck portions of the cover blank over the edges of the box.

48. A box covering machine comprising means for feeding a box along in a rectilinear path, and cover applying mechanism embodying means which remain in full contact with the box while moving along with the traveling box operating to press the covering material on the box, and means operating to press portions of the cover blank around the corners of the box.

49. A box covering machine comprising oppositely arranged traveling presser pads, tuckers traveling with said pads and embodying tucker fingers, and means for automatically shifting the ends of the tucker fingers relatively to the working faces of the pads, for the purpose specified.

50. A box covering machine comprising oppositely arranged traveling presser pads, tuckers carried by said pads and embodying tucker fingers, finger bars, and means for tilting said bars relatively to the working faces of the pads, for the purpose specified.

51. A box covering machine comprising oppositely arranged traveling presser pads, tuckers moving with said pads and embodying tucker fingers, finger bars, and drive chains with which said finger bars have a sliding engagement.

52. A box covering machine comprising oppositely arranged traveling presser pads, tuckers moving with said pads and embodying tucker fingers, finger bars, slides on the finger bars, and drive chains for said finger bars having guides which receive and control the movements of said slides.

53. A box covering machine comprising oppositely arranged traveling presser pads, tuckers moving with said pads, and cam operated means for tilting the tuckers automatically relatively to the working faces of the pads.

54. A box covering machine comprising oppositely arranged traveling presser pads, means for driving said pads, tuckers moving with the pads and embodying tucker fingers, finger bars, chains for driving said bars, and cam controlled bell crank levers connected with the finger bars for tilting the fingers relatively to the working faces of the pads.

55. A box covering machine comprising oppositely arranged traveling presser pads, means for driving said pads, tuckers moving with the pads and embodying tucker fingers, finger bars, chains for driving said bars, and cam-controlled bell crank levers having a yielding connection with the finger bars and operating to tilt the fingers relatively to the working faces of the pads.

56. A box covering machine comprising oppositely arranged traveling presser pads, means for driving said pads, and tuckers movable with the pads and embodying spring fingers.

57. A box covering machine comprising oppositely arranged traveling presser pads, means for driving said pads, and tuckers movable with the pads and embodying fingers of sheet spring metal, each finger being split to form relatively yielding portions.

58. A box covering machine comprising oppositely arranged traveling presser pads, means for driving said pads, and tuckers movable with the pads and each embodying a sheet metal finger provided with an angular toe or extension at the corner.

59. A box covering machine comprising oppositely arranged traveling presser pads, means for driving said pads, finger bars movable with the pads, and tucker fingers detachably connected to said finger bars.

60. A box covering machine comprising oppositely arranged traveling presser pads, means for driving said pads, finger bars moving with the pads, and provided with studs, and tucker fingers carried by said bars and provided with slots to receive said studs, whereby the fingers are made detachable from the finger bar.

61. A box covering machine comprising oppositely arranged traveling presser pads, means for driving said pads, finger bars movable with the pads and having studs, tucker fingers carried by said bars and having slots for said studs, and means for clamping the fingers on the finger bars.

62. A box covering machine comprising oppositely arranged traveling presser pads, means for driving said pads, finger bars movable with the pads and having studs and clamp screws, and tucker fingers carried by said bars and having angle slots to receive said studs and screws, whereby the fingers are rendered detachable.

63. A box covering machine comprising cover-affixing members, a box carrying plunger embodying relatively slidable sections having rack faces, and a drive pinion engaging said rack faces.

64. A box covering machine comprising cover-affixing members, a bottom box carrying plunger embodying relatively slidable sections having rack faces, and means including a chain operated pinion meshing with said rack faces for extending and retracting one section relatively to another.

65. A box covering machine comprising cover-affixing members, a box carrying plunger embodying relatively slidable sections, a weight geared to the plunger for sliding one section relatively to another, and means for locking adjoining sections together to cause both sections to move together.

66. A box covering machine comprising cover-affixing members, a box carrying plunger embodying relatively slidable sections, a weight geared to the plunger for sliding one section relatively to another, means for locking adjoining sections together to cause both sections to move as one, and means for automatically unlocking said sections at a given point, for the purpose specified.

67. A box covering machine comprising cover-affixing members, a bottom box carrying plunger embodying movable telescopic sections, and rack and pinion mechanism for actuating the movable sections of said plunger.

68. A box covering machine comprising cover-affixing members, a bottom box carrying plunger embodying telescopic sections, and means including a weight-controlled endless chain and rack and pinion elements for imparting movement to said plunger.

69. A box covering machine comprising cover-affixing members, a bottom box carrying plunger embodying telescopic sections, a weight controlled shaft, and rack and pinion mechanism whereby in the rotation of said shaft movement is imparted first to one plunger section and then to both plunger sections and vice-versa.

70. A box covering machine comprising cover-affixing members, a box carrying plunger embodying telescopic sections, each having a rack face, a pinion meshing therewith for actuating the plunger sections, and means for turning said pinion.

71. A box covering machine comprising cover-affixing members, a box carrying plunger embodying telescopic sections, each having a rack face, a pinion meshing therewith for actuating the plunger sections, and gravity-controlled means for actuating said pinion.

72. A box covering machine comprising cover-affixing members, a box actuating plunger, a plunger operating cam, a cam-operated lever, multiplying rack and pinion gears, and a connecting rod connecting said lever with the plunger.

73. A box covering machine comprising cover-affixing members, means for carrying a box in a vertical path between said members, and oppositely arranged thumb holers acting simultaneously on the upright sides of the box during the movement of the box through the machine.

74. A box covering machine comprising cover-affixing members, means for carrying a box in a vertical path between said members, and thumb holers at opposite sides of the path of movement of the box, operating in a horizontal plane.

75. A box covering machine comprising in combination cover-affixing members, means for carrying a box in a vertical path between said members, thumb holers operating perpendicular to the path of movement of the box and simultaneously on opposite sides of the box while in the machine, and means for adjusting the thumb holers to suit boxes of different sizes.

76. A box covering machine comprising cover-affixing members, means for carrying a box between said members, thumb holers located at opposite sides of the path of movement of the box, and means for adjusting the cover-affixing members and thumb holers toward and away from a common center.

77. A box covering machine comprising in combination cover-affixing members, means for carrying a box between said members, oppositely arranged thumb holers each embodying a cylindrical cutter operating in a plane perpendicular to the path of movement of the box, a tubular guide for said cutter having a box edge receiving notch, means for actuating the cutter, and means on the machine for adjusting the thumb holers toward and away from a common center.

78. A box covering machine comprising box-feeding mechanism, cover-affixing members, and a kicker for ejecting the box at a certain point in the travel thereof, said kicker embodying a longitudinally movable kicker arm, and a stem adjustable across the plane of said arm and carrying a kicker head, said arm being pivotally mounted to adapt the kicker head to swing toward and away from the path of the box.

79. A box covering machine comprising box-feeding mechanism, cover-affixing members, pick-off fingers, and means for simultaneously swinging the fingers and box ejector with a pivotal movement toward and away from the path of the box.

80. In a box covering machine, the combination of a box feeding mechanism, a slidably mounted member movable transversely to the path of the box, end tuckers spaced apart on the member disposed parallel to each other and parallel to the path of movement of the box and adjustable toward and from each other, means for clamping the tuckers in different positions of adjustment on the member, and means for moving the member back and forth in timed relation to the box-feeding mechanism.

81. A box covering machine comprising box-feeding mechanism, cover affixing mechanism, and oscillatory guards operating adjacent to and independently of and immediately above said cover affixing mechanism.

82. A box covering machine comprising box-feeding mechanism, cover-affixing mechanism, and oscillatory guards operating adjacent to and independently of said cover-affixing members.

83. A box covering machine comprising box feeding mechanism, cover-affixing members, guards arranged adjacent to said members, and means for advancing and retracting said guards relatively to the path of movement of the box, and independently of the cover affixing members.

84. A box covering machine comprising cover-affixing members, and box feeding mechanism, embodying a plunger, a plunger block around which the box is placed, guides carried by said block, slide bars having pins adapted to engage said guides, and box holding fingers carried by said side bars.

85. A box covering machine comprising a plunger, a block, a flange on the end of said plunger, locating means on said flange adapted to enter a recess in the block, and means on the plunger adapted to hold the block against said flange.

86. A box covering machine comprising box feeding means, and cover applying mechanism embodying end tuckers, and springs movable with and projecting beyond the advance edges of the tuckers and adapted to bear against the sides of the box.

87. A box covering machine comprising box feeding means, and cover applying mechanism embodying relatively adjustable blades; and presser springs movable with and projecting beyond the blades.

88. A box covering machine comprising box feeding means, and cover applying mechanism embodying tuckers each comprising a plurality of blades adjustable one relatively to another, and presser springs.

89. A box covering machine comprising box feeding means, and cover applying mechanism embodying tuckers each comprising relatively adjustable blades offset one relatively to another, and presser springs.

90. A box covering machine comprising cover-affixing members, means for carrying a box between said members, thumb-holers located at opposite sides of the path of movement of the box, means for adjusting the cover-affixing members and thumb-holers toward and away from a common center, and means for raising and lowering the thumb-holers to suit boxes of different heights.

91. A box covering machine comprising box feeding means, and covering applying mechanism embodying tucking elements which move along with the box independently of the box feeding means and act to tuck the covering material over the top edge of the box and gradually wipe and press the same against the inside of the box as the tucker travels downward inside of the box.

92. A box covering machine comprising parallel shafts, and a flat flexible pad movable around said parallel shafts and embodying a shoulder adapted to fold the margin of the cover wrap over the top edge of the box.

93. A box covering machine comprising parallel shafts and a flat flexible pad movable around said parallel shafts and embodying a shoulder adapted to fold the margin of the cover wrap over the top edge of the box, and a tucker finger moving with said pad and operating to press the margin of the cover wrap against the inside of the box.

94. A box covering machine comprising oppositely-arranged elements for pressing the cover wrap against the box sides, means actuating the elements, end tuckers for applying the ends of the wrap to the box ends, and thumb holers movable with the end tuckers.

95. In a box covering machine, the combination of end tuckers, a support therefor, a thumb holer mounted on the support and movable therewith, said thumb holer including a cutter, means for moving the support to operative position, and means for operating the cutter after the thumb holer has been moved to operative position.

96. In a box covering machine, the combination of end tuckers, a slide on which the tuckers are mounted, a thumb holer mounted on the slide between the end tuckers, means for moving the slide for carrying the end tuckers and thumb holer to and from operative position, said thumb holer having means for gripping the edge of the box and a cutter for cutting such edge, and means for operating the cutter after the thumb holer is gripped with the box.

97. A box covering machine comprising end tucking means, an actuator therefor, a thumb holer movable with the end tucking means, said thumb holer including means for gripping the edge of a box and a cutter for holing the box, and an actuator for moving the cutter while the thumb holer grips the box.

98. In a box covering machine, the combination of end tucking means, a movable support therefor, a shaft, operating means mounted on the shaft and connected with the support for moving the latter, a thumb holer mounted on the support and movable therewith and including a cutter, and operating means also mounted on the shaft for actuating the cutter.

99. In a box covering machine, the combination of a box feeding mechanism, a support movable transversely to the path of the box, means pivotally mounted on the support for gripping the edge of the box, said means comprising a tubular member adapted to ride inwardly over the top edge of the box and having a slot for receiving said edge, a cutter carried by the tubular member, and means for actuating the cutter after the edge of the box is entered in the notch of the member.

100. A box covering machine comprising cover-affixing members, means for moving a box in the path between the members, a plurality of thumb holers, and means for actuating the thumb holers simultaneously during the movement of the box through the machine.

101. A box covering machine comprising cover-affixing members, means for moving a box in a path between said members, thumb holers adapted to act upon opposite sides of the box during the movement of said box through the machine, and means for actuating said thumb holers.

102. A box covering machine comprising cover affixing members, means for moving a box in a path between said members, thumb holers at opposite sides of the path of movement of said box and operating substantially at right angles to the said path.

103. A box covering machine comprising a box feeding mechanism, a pair of thumb holers movable simultaneously inwardly into engagement with the box, each thumb holer including a cutter, means for moving the thumb holers back and forth, and additional means for moving the cutters after the thumb holers are engaged with the box.

104. A box covering machine including a presser roll consisting of relatively-yielding and non-yielding sections forming the body of the roll, the yielding section consisting of an approximately semi-cylindrical spring fastened at one edge and free at the opposite edge, said free edge being contiguous with the non-yielding section of the roll, and cushioning material on the outer surfaces of the said sections.

105. A box covering machine including a presser roll having contiguous yielding and non-yielding portions extending longitudinally, and metal faces separating the two portions and fastened respectively thereto whereby one face slides on the other to permit a box wrap to be pressed on the shouldered face of a box.

106. A box covering machine including a presser roll consisting of a yielding section and a non-yielding section, said yielding section being formed of an approximately semi-cylindrical spring extending longitudinally of the roll and having its free edge bent into an outstanding flange, a covering of flexible material on the outer face of the spring and meeting the said flange, a covering of flexible material on the non-yielding section of the roll, and a metal strip fixed to the non-yielding portion and on which the flange of the spring slidably bears.

107. A box covering machine comprising box and wrapper covering means, a plurality of relatively adjustable units embodying presser rolls having a yielding cylindrical presser face and a shoulder, and a thumb holer arranged to operate on the box after the latter is carried past the rolls of the units by the said means.

108. A box covering machine comprising box feeding means, and cover applying mechanism embodying tuckers each comprising a plurality of blades adjustable one relatively to another.

109. A box covering machine comprising box feeding means, and cover applying mechanism embodying tuckers each comprising relatively adjustable blades offset one relatively to another.

110. A box covering machine comprising plunger mechanism for directing the box in a rectilinear path, and cover affixing mechanism embodying a unit frame and turn-in and wipe-on fingers on said unit operating in the direction of movement of the box to tuck in the flap portions of the cover wrap over the top of the box side and fold the same down and wipe the same against the inside of the box.

111. In a box covering machine, the combination of box carrying means, and cover affixing mechanism embodying a presser roll comprising a body of two parts forming together the complete peripheral surface of the roll, one part being rigid and the other part being flexible and having a connection with the rigid part and extending longitudinally thereof and free from the body at all other points, the portion of the rigid part adjacent to the free edge of the flexible part forming a shoulder extending longitudinally of the roll and projecting beyond the free edge of the flexible part.

112. In a box covering machine, a cover affixing mechanism embodying a roll having an approximately semi-cylindrical rigid section and a semi-cylindrical flexible section of smaller radius than the rigid section and having one edge fastened to the latter with the opposite free edge disposed inwardly from the periphery of the rigid section whereby both sections coöperate to form a longitudinal shoulder.

In testimony whereof we affix our signatures in presence of two witnesses.

JOHN P. MARKERT.
R. STANLEY BOLGER.

Witnesses:
C. GEISSLER,
MARTIN LOGAN.